US011438837B2

(12) United States Patent
Bartier et al.

(10) Patent No.: US 11,438,837 B2
(45) Date of Patent: *Sep. 6, 2022

(54) DOWNLINK EVENT ALLOCATION IN A NETWORK

(71) Applicant: Itron, Inc., Liberty Lake, WA (US)

(72) Inventors: Jerome Bartier, Edinburgh (GB); Keith Barnes, Waseca, MN (US); Thomas Uhling, Spokane Valley, WA (US); Yacine Khaled, Meudon (FR); Khalid Maallem, Issy les Moulineaux (FR)

(73) Assignee: Itron, Inc., Liberty Lake, WA (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/670,046

(22) Filed: Oct. 31, 2019

(65) Prior Publication Data

US 2021/0136686 A1 May 6, 2021

(51) Int. Cl.
*H04W 52/02* (2009.01)
*H04W 72/12* (2009.01)
*H04W 84/18* (2009.01)

(52) U.S. Cl.
CPC ... *H04W 52/0219* (2013.01); *H04W 52/0216* (2013.01); *H04W 52/0222* (2013.01); *H04W 72/121* (2013.01); *H04W 84/18* (2013.01)

(58) Field of Classification Search
CPC ........... H04W 52/0219; H04W 72/121; H04W 52/0222; H04W 52/0216; H04W 84/18;
(Continued)

(56) References Cited

U.S. PATENT DOCUMENTS

2013/0301501 A1 11/2013 Olvera-Hernandez et al.
2014/0086231 A1 3/2014 Proctor, Jr. et al.
(Continued)

FOREIGN PATENT DOCUMENTS

EP 2695469 2/2014

OTHER PUBLICATIONS

The PCT Search Report and Written Opinion dated Jan. 29, 2021 for PCT application No. PCT/US20/58289, 16 pages.
(Continued)

*Primary Examiner* — Walter J DiVito
(74) *Attorney, Agent, or Firm* — Lee & Hayes, P.C.

(57) ABSTRACT

Techniques for allocating event offsets within a period of transmission are described. A mains-powered device (MPD) may act as a "parent" to one or more battery-powered devices (BPDs). The MPD may assign "event offsets" to each BPD. The event offset is a time by which the BPD's timeslot is "offset" from the start of a periodic cycle of transmissions by the MPD. Thus, each event offset indicates a time that the BPD must be "awake," i.e., operating its radio receiver and/or performing other functionality. A BPD may spend a substantial fraction of its time in a "sleep" mode, wherein less power is used and fewer functions are performed than during a period of that BPD's event offset. Another BPD may have a different event offset. Communications by the MPD with each child BPD may be substantially uniformly distributed over the period. To increase efficiency, groups of BPDs may receive multicasts.

20 Claims, 17 Drawing Sheets

(58) Field of Classification Search
CPC . H04W 72/005; H04W 52/0248; H04W 4/38; H04W 4/70; Y02D 30/70; H04Q 9/02; H04Q 2209/40; H04Q 2209/883; G01D 4/002

See application file for complete search history.

(56) References Cited

U.S. PATENT DOCUMENTS

| | | | |
|---|---|---|---|
| 2015/0330318 A1* | 11/2015 | Petersen | B60H 1/00657 |
| | | | 701/113 |
| 2019/0279181 A1* | 9/2019 | Kelly | G06Q 20/202 |
| 2020/0187121 A1 | 6/2020 | Abbasi et al. | |
| 2020/0336233 A1* | 10/2020 | Dinan | H04W 72/0446 |
| 2021/0136692 A1 | 5/2021 | Uhling et al. | |

OTHER PUBLICATIONS

The International Preliminary Report on Patentability for PCT Application No. PCT/US20/58289, dated May 12, 2022.

* cited by examiner

| Period of Time 402 | | | |
|---|---|---|---|
| Event Offset 404 | Event Offset 406 | Event Offset 408 | ... | Event Offset 410 | Event Offset 412 | Event Offset 414 |

| Period of Time 502 | | | | | | | | |
|---|---|---|---|---|---|---|---|---|
| Event Offset 504 | Event Offset 506 | Event Offset 508 | Event Offset 510 | Event Offset 512 | ... | Event Offset 514 | Event Offset 516 | Event Offset 518 | Event Offset 520 | Event Offset 522 |

DOWNLINK EVENT ALLOCATION IN A NETWORK

BACKGROUND

In a wireless network environment, both battery-powered devices and mains-powered devices may send and receive packets. While conservation of electricity in the operation of mains-powered devices is not usually a critical design parameter, battery-powered devices face significant constraints due to their limited available power. In some network environments, such as water and gas metering devices, the expected lifespan of a battery may be 20 years. Accordingly, techniques that make the most of available power are desirable.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 4 is a timing diagram showing example downlink event allocation and showing an example period of time and event offsets within that period of time.

FIG. 5 is a timing diagram showing an example period of time after inclusion of additional event offsets resulting in each event offset being shortened.

DETAILED DESCRIPTION

Overview

Figure 1:
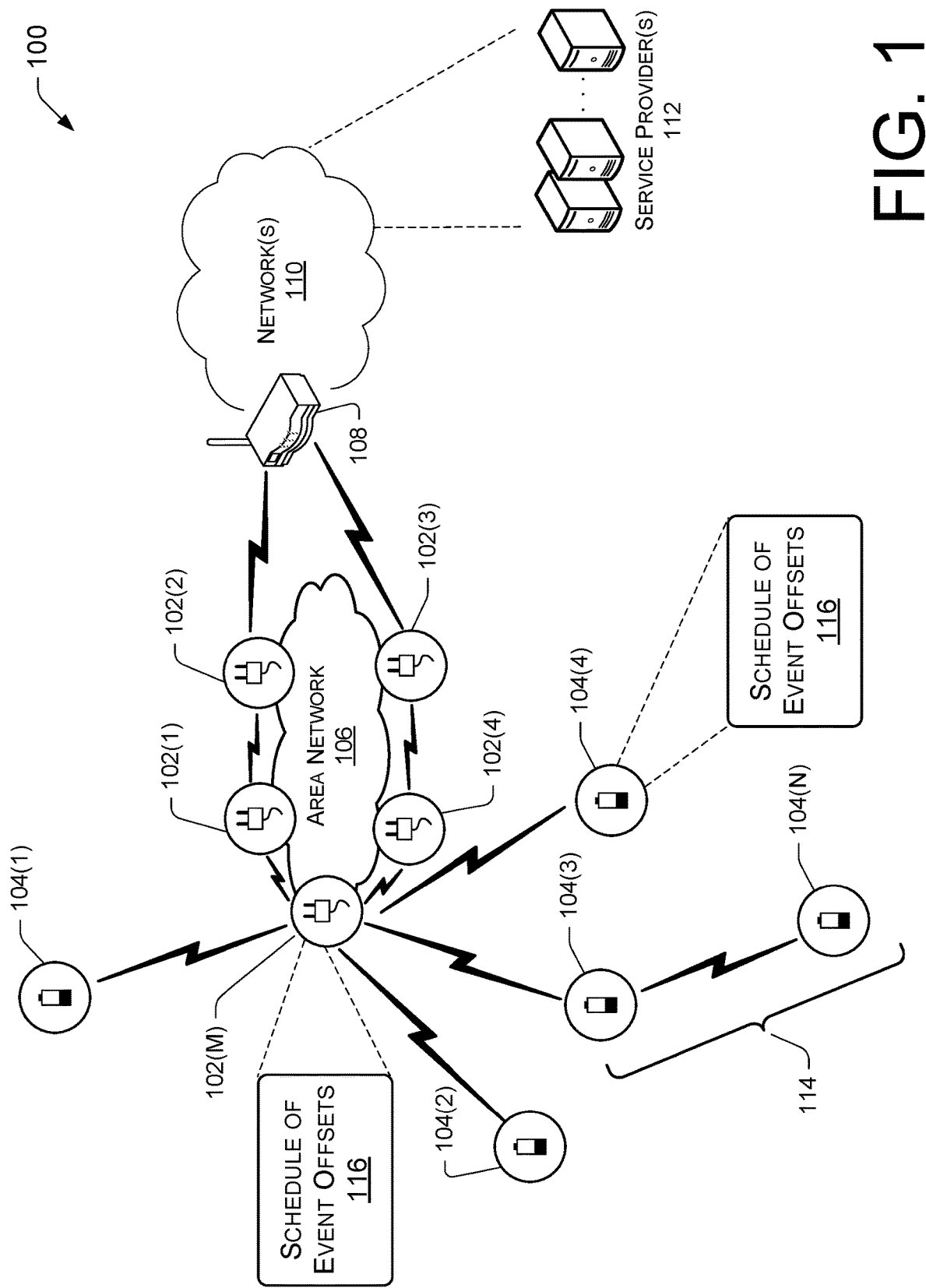
FIG. 1 is a schematic diagram of an example network architecture.

A wireless network of devices may include one or more mains-powered device (MPD) and one or more battery-powered device (BPD). The MPDs are connected to an electrical power grid, and their radio usage and processing abilities are not limited by the availability of electricity, whereas the BPDs are constrained to the electricity provided by their batteries.

In one example, each BPD has a "parent" device that is an MPD. In the example, each MPD may be associated with one or more "child" BPDs, and may assign "event offsets" to each of its child BPD node(s). The event offsets are a time by which the BPD's timeslot is "offset" from the start of a periodic cycle of transmissions. Thus, each event offset indicates a time that the BPD is scheduled to be "awake," i.e., operating its radio receiver and/or performing other functionality. Another BPD may have a different event offset. Accordingly, communications by the MPD with each child BPD is spread over the period of time. Techniques for uniformly distributing communications with the BPDs over the period are described. In an example, a BPD may spend a substantial fraction of its time in a "sleep" mode, wherein less power is used and fewer functions are performed than during a period associated with that BPD's event offset, thus allowing the BPDs to conserve electricity.

Example events may include at least a time during which the BPD is able to receive information, e.g., data and/or a command, etc., and perhaps send information over the wireless network. The time of the event may include a start time, and possibly an end time and/or duration of the event. The event may include the transfer of information from the BPD to the MPD, or the reverse, etc. In a further example, an MPD assigns event offsets to each BPD in a manner that minimizes overlap in time and provides a start-time and/or time-period for one- or two-way unicast transmission to each BPD. In some examples, two or more BPDs may be associated with a multicast and/or broadcast event timed according to one or more event offsets. The use of event offsets reduces the amount of time during which the BPDs need to be "awake" to receive radio signals and allows the BPDs to turn on a radio in a just-in-time manner.

In an example, event offsets that are used during the period of time to manage timing of transmission of messages to devices on a network are spread substantially uniformly among the plurality of event offsets. Thus, some event offsets may be used by the MPD for communication with BPDs. However, other event offsets may not be used (e.g., if there are more event offsets than BPD associated with an MPD). In such a situation, the event offsets to be used may be selected to time communications between devices in a manner that distributes the communications over the period of time such that their variance (e.g., the variance of the distribution of the used event offsets within the period of time) is less than a threshold value.

Some event offsets may be used for broadcast and multicast groups. In an example, such event offsets may be selected to be at the beginning of a period of time. Remaining event offsets are used for unicast transmissions. If a number of the remaining event offsets is less than the number of devices in a network associated with a particular "parent" device (e.g., an MPD), some event offsets may be associated with a number (e.g., "x") of devices and other event offsets may be associated with the number plus one (e.g., "x+1") devices. In such a situation, the event offsets to be used once more than other event offsets may be selected to time communications between devices in a manner that distributes the communications over the period of time such that the variance of the distribution (e.g., the variance of the distribution of the used event offsets within the period of time) is less than a same or different threshold value.

In examples, MPDs and BPDs may be deployed in different network types. Such network types may include mesh networks, star networks, and/or hybrid networks having mesh and star characteristics and/or portions. An event may include a broadcast event to a plurality of BPDs. An event may include a multicast to a plurality or group of BPDs. An event may include a unicast transmission to, or series of messages between, MPD(s) and/or BPD(s). In an example, the BPDs are utility meters, such as gas or water meters. The MPD(s) may be relay devices, electric metering devices, dedicated communications devices, etc. In a more specific example, the MPD(s) may be electricity meters, which relay data from BPDs that may be water meters, gas meters, or other devices.

Each mains-powered device may transmit and receive information in a periodic manner. In an example, the MPD may perform one- or two-way communications and/or other events with a series of BPDs. The communications and/or events may be performed in a sequence over a period of time. Within the period, a plurality of BPD each have their event offset from the start of the period, within which they communicate with the MPD. A schedule of event offsets within the period of time may be used to coordinate a plurality of events, including event timing, event sequence and ordering, event distribution over the period (e.g., substantially uniform distribution and/or variance of event distribution under a threshold value), etc. During additional and subsequent periods of time, the communications and/or events may be repeated.

Example Environment

FIG. 1 shows an example networked environment or architecture 100. The architecture 100 includes multiple network communication devices. The network communication devices include MPD mains-powered devices (MPD) 102(1), 102(2), 102(3), 102(4), . . . 102(M) (collectively referred to as "MPDs 102"), and BPD battery-powered devices (BPDs) 104(1), 104(2), 104(3), . . . 104(N) (collectively referred to as "BPDs 104"), where M and N are any integers greater than or equal to 1 and may be the same number or different numbers. In some illustrations, the MPDs 102 include more functionality/resources than the BPDs 104. In one example, the MPDs 102 are implemented as mains-powered devices (MPDs) that are connected to mains electricity (e.g., electricity meters), while the BPDs 104 are implemented as battery-powered devices (BPDs) that are not connected to mains electricity (e.g., water meters, gas meters, etc. that employ batteries). However, in other examples, the MPDs 102 and BPDs 104 may have different processing power, processing capabilities, and so on. The techniques discussed herein may be implemented to communicate between MPDs 102, BPDs 104, or any combination of devices.

The network communication devices are in communication with one another via an area network (AN) 106. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, etc.

The term "link" refers to a direct communication path between two devices (without passing through or being relayed by another device). A link may be over a wired or wireless radio frequency (RF) communication path. Each link may represent a plurality of channels over which a device is able to transmit or receive data. Each of the plurality of channels may be defined by a frequency range which is the same or different for each of the plurality of channels. In some instances, the plurality of channels comprises RF channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the area network 106 may comprise a star network, in which a central device acts a parent to one or more children devices. For example, the MPD 102(M) may act as a parent to the BPDs 104(1), 104(2), and 104(3). Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In many examples, the BPDs 104 are implemented as leaf nodes. A leaf node may generally communicate with a parent node and not relay data for another node. As illustrated in FIG. 1, the BPDs 104(1) and 104(2) act as leaf nodes, with the MPD 102(M) being the parent node. However, in other examples the BPDs 104 may relay data for other nodes. For instance, the BPD 104(3) may relay data for the BPD 104(N). Further, any type of device may be implemented as a leaf node (e.g., any of the MPDs 102).

The communication network 100 may also include an edge device 108, which serves as a connection point of the AN 106 to one or more networks 110 (e.g., a backhaul network), such as the internet. The edge device 108 may include, but is not limited to, a field area router (FAR), a cellular relay, a cellular router, an edge router, a DODAG (Destination Oriented Directed Acyclic Graph) root, a root device or node of the AN, a combination of the foregoing, etc. In this illustrated example, the edge device 108 comprises a FAR, which relays communions from the AN 106 to one or more service providers 112 via the network(s) 110.

In some instances, the one or more service providers 112 comprise one or more central office computing systems that include a security service such as authentication, authorization and accounting (AAA) server, a network registration service such as dynamic host configuration protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. The network communication devices may register or interact with some or all these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the one or more service providers 112 comprise other systems to implement other functionality, such as web services, cloud services, and so on. In yet other instances, the one or more service providers 112 may be implemented as other types of devices, such as in the context of the internet of things (IoT) that allows a variety of devices to exchange data.

The one or more service providers and/or their computing systems 112 may be physically located in a single central location, or may be distributed at multiple different locations. The one or more service providers 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

In many instances, a battery-powered device (BPD) may connect to a network by connecting directly with MPD mains-powered device (MPD). To illustrate, a battery-powered water meter, for example, the BPD 104(1), discovers in its vicinity an electricity meter, the MPD 102(M), connected to mains power. Because the MPD 102(M) is connected to mains power, it has no practical energy constraints. The BPD 104(1) may associate the MPD 102(M) as its parent, in which case the MPD 102(M) acts as the connecting point between the BPD 104(1) and the one or more service providers 112.

In other instances, an BPD can connect to a network via an BPD that acts as a relay (an BPD relay). To illustrate, the BPD 104(N) may be a gas meter, which discovers a battery-powered water meter, the BPD 104(3), which is already connected to the AN 106 via the MPD 102(M) and can play the role of an BPD relay. Accordingly, the nodes 104(3) and 104(N) form an example mesh network 114 within a star network centered at the MPD 102(M). The BPD 104(N) may associate this BPD-relay, the BPD 104(3), as its parent to get connected to the AN 106. In yet further instances, an BPD may connect to other networks and/or connect in other manners.

A schedule of event offsets 116 may be used by the MPD and the BPD (e.g., mains-powered device and battery-powered devices, respectively). By using the schedule, the MPDs and the BPDs may recognize different event offsets and associated events within a period of time. The schedule of event offsets 116 may show event starting points according to offsets in time from the beginning of the period of time. The schedule of event offsets 116 may be used to coordinate a plurality of events, including event timing, event sequence and ordering, event distribution over the period (e.g., substantially uniform distribution and/or having a variance of event distribution under a threshold value), etc. During additional and subsequent periods of time, the communications and/or events may be repeated, such as by repeated reference to the schedule of event offsets 116.

Example Network Communications Devices

Figure 2:
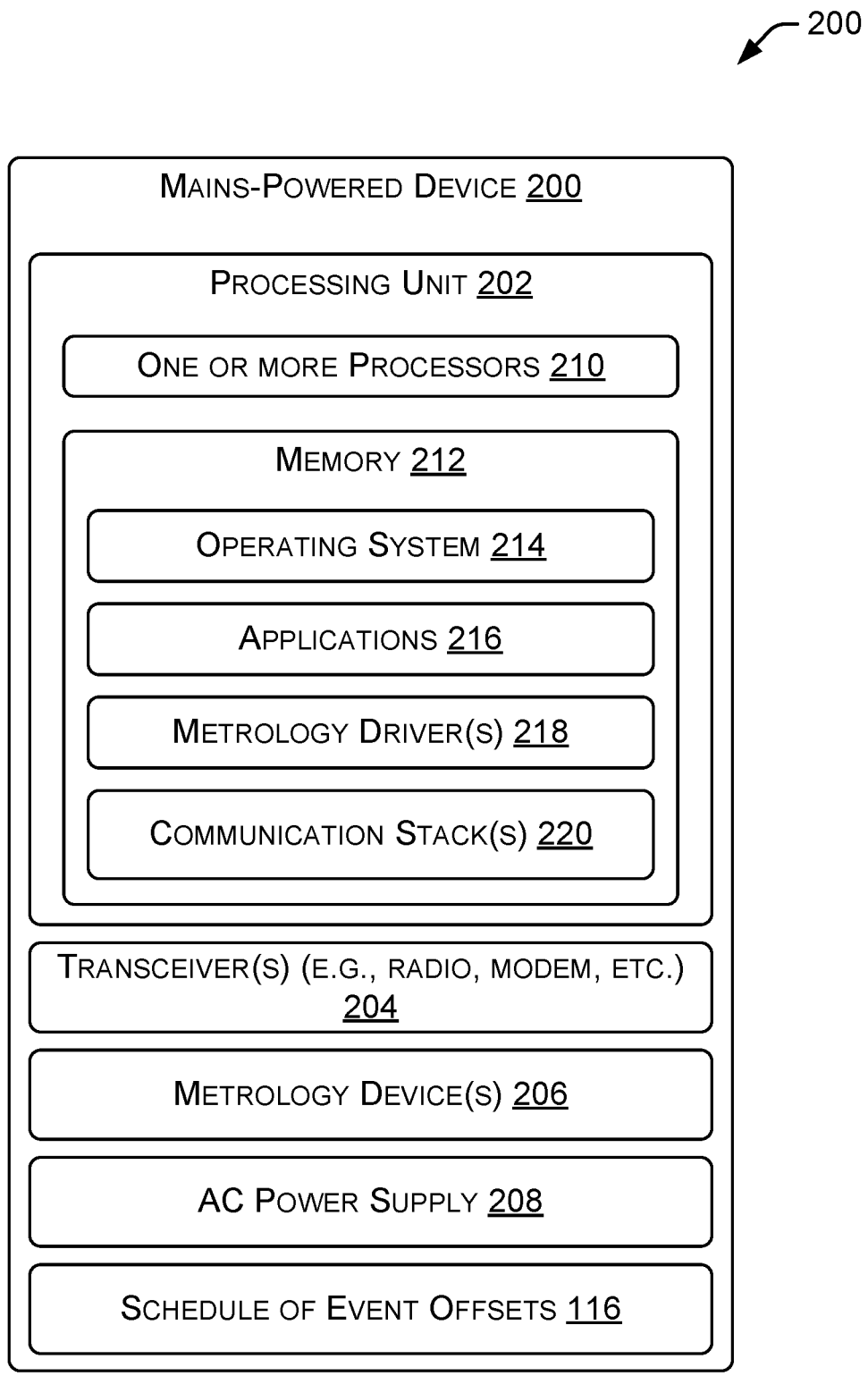
FIG. 2 is a diagram showing details of an example mains-powered device.

FIG. 2 is a diagram showing details of an example mains-powered device 200 (MPDMPD). In this example, MPD 200 comprises a device that is connected to mains power, such as an electricity meter, sensor, etc. However, as discussed above, MPDs can take numerous different forms, depending on the industry and context in which they are deployed. Different types of MPDs may have different physical and/or logical components. For instance, utility meter MPDs such as that shown in FIG. 2A may have metrology components, whereas other types of MPDs may not.

As shown in FIG. 2, the example MPD 200 includes a processing unit 202, a transceiver 204 (e.g., radio), one or more metrology devices 206, and an alternating current (AC) driven power supply 208 that couples to the AC mains power line wherein the MPD 200 is installed. The processing unit 202 may include one or more processors 210 and memory 212. When present, the one or more processors 210 may comprise microprocessors, central processing units, graphics processing units, or other processors usable to execute program instructions to implement the functionality described herein. Additionally, or alternatively, in some examples, some or all the functions described may be performed in hardware, such as an application specific integrated circuit (ASIC), a gate array, or other hardware-based logic device.

The transceiver 204 may comprise one or more hardware and/or software implemented radios to provide two-way RF communication with other network communication devices in the AN 106 and/or other computing devices via the network 110. The transceiver 204 may additionally or alternatively include a modem to provide power line communication (PLC) communication with other network communication devices that are connected to an electrical service grid.

The metrology device(s) 206 comprise the physical hardware and sensors to measure consumption data of a resource (e.g., electricity, water, or gas) at a site of the meter. In the case of an electric meter, for example, the metrology device(s) 206 may include one or more Hall effect sensors, shunts, etc. In the case of water and gas meters, the metrology device(s) 206 may comprise various flow meters, pressure sensors, etc. The metrology device(s) 206 may report the consumption data to the one or more service providers 112 via the transceiver 204. The consumption data may be formatted and/or packetized in a manner, protocol and/or modulation scheme for transmission.

The memory 212 includes an operating system (OS) 214 and one or more applications 216 that are executable by the one or more processors 210. The memory 212 may also include one or more metrology drivers 218 configured to receive, interpret, and/or otherwise process the metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, and/or another protocol. However, in other examples, other protocols may be used, depending on the networks with which the device is intended to be compatible. The communication stack(s) 220 describe the functionality and rules governing how the MPD 200 interacts with each of the specified types of networks. For instance, the communication stack(s) 220 may cause MPDs and BPDs to operate in ways that minimize the battery consumption of BPDs when they are connected to these types of networks.

In some instances, the MPD 200 may be configured to send and/or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The schedule of event offsets 116 may include offset times (from the start of a period of time) at which one or more "child" nodes expect a communication from the mains-powered device. Using the schedule 116, the mains-powered device can communicate with a plurality of battery-powered devices, using broadcast, multicast and/or unicast techniques, at appropriate timed event offsets within a period of time.

Figure 3:
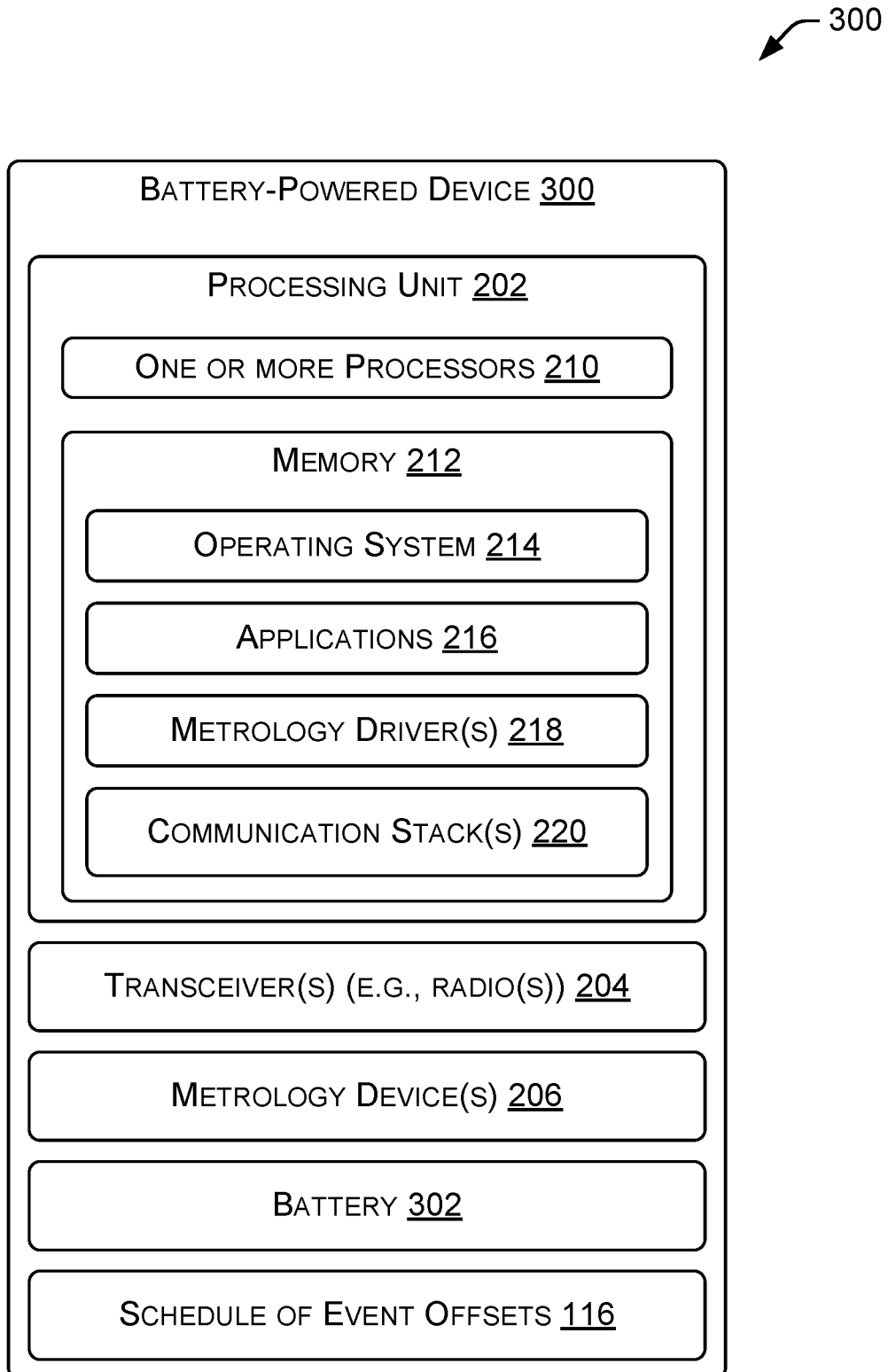
FIG. 3 is a diagram showing details of an example battery-powered device.

FIG. 3 is a diagram showing details of an example battery-powered device 300. In this example, BPD 300 comprises a device that is not connected to mains power. However, as discussed above, BPDs can take numerous different forms, depending on the industry and context in which they are deployed. Different types of BPDs may have different physical and/or logical components. For instance, utility meter BPDs such as that shown in FIG. 3 may have metrology components, whereas other types of BPDs may not.

The BPD 300 of FIG. 3 is similar in many respects to the MPD 200. To the extent that the MPD 200 and BPD 300 include the same or similar components, the functions will not be repeated here. Therefore, the following discussion of the BPD 300 focuses on the differences between the BPD 300 and the MPD 200. However, the differences highlighted below should not be considered to be exhaustive. One difference between the MPD 200 and the BPD 300 is that the BPD 300 may include a battery 302 instead of the AC power supply 208. The specific characteristics of the battery 302 may vary widely depending on the type of BPD. By way of example and not limitation, the battery 302 may comprise a lithium thionyl chloride battery (e.g., a 3-volt battery having an internal impedance rated at 130 Ohms), a lithium manganese battery (e.g., a 3-volt battery having an internal impedance rated at 15 Ohms), a lithium ion battery, a lead-acid battery, an alkaline battery, etc.

Also, in some examples, even components with similar functions may be different for MPDs than for BPDs due to the different constraints. As one example, while both MPDs and BPDs have transceivers, the specific transceivers used may be different. For instance, an MPD transceiver may include a PLC modem while an BPD transceiver does not because the BPD is not connected to an electrical power line that could be used for PLC communications. Additionally, or alternatively, an BPD transceiver may employ a lower power RF radio to minimize energy consumption. Further, other components of MPDs and BPDs may vary. In some instances, BPDs are implemented with less functionality and/or include less hardware components than the MPDs. Further, in some instances, components of BPDs are lower power components than the corresponding components of the MPDs.

The memory 212 of the MPD 200 and BPD 300 is shown to include software functionality configured as one or more "modules." However, the modules are intended to represent example divisions of the software for purposes of discussion and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein are examples of computer-readable media. Computer-readable media may take the form of volatile memory, such as random-access memory (RAM) and/or non-volatile memory, such as read-only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain computing devices (e.g., the MPD 200 and the BPD 300) are described herein, it should be understood that those computing devices may include other components and/or be arranged differently. As noted above, in some instances a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing. Further, in some examples a computing device may be implemented as that described in U.S. application Ser. No. 14/796,762, filed Jun. 10, 2015 and titled "Network Discovery by Battery Powered Devices," the entire contents of which are incorporated herein by reference.

By way of example and not limitation, the MPD 200 and/or the BPD 300 may implement a variety of modulation schemes, techniques, and/or data rates, such as frequency-shift keying (FSK) 802.15.4g (e.g., mandatory mode with a data rate of 50 kbps or 75 kbps, no forward error correction; legacy mode with a data rate of 150 kbps with forward error correction code rate ½; option 2; etc.), offset quadrature phase-shift keying (OQPSK) modulation with direct-sequence spread spectrum (DSSS) spreading, and so on. To implement these different connection modes, a media access control (MAC) sub-layer of a device may be able to indicate to a physical layer the modulation technique and data rate to be used for each transmission.

In many instances, information that is included in an information element may be stored in the memory 212 of the MPD 200 and/or the BPD 300. For example, the memory 212 may store any information regarding an operating context, such as schedule data, channel data, seed data, timing data, and so on. In some instances, components of the MPD 200 and/or the BPD 300 may reference the information to determine how to communicate according to a specific operating context.

The schedule of event offsets 116 may include offset times (from the start of a period of time) at which the battery-powered device 300 may participate in an event offset, i.e., an event that is offset from the start of a period of time by the offset amount. In an example, the device 300, i.e., a "child" device of a mains-powered device, can expect a communication from the parent at a time indicated by the schedule. Using the schedule 116, the battery-powered child device may communicate with the mains-powered device, using broadcast, multicast and/or unicast techniques, using appropriate frequencies and modulation schemes, at timed event offsets within a period of time. The schedule 116 of the battery-powered device may be a subset of the schedule 116 of the mains-powered device, in that the schedule of the child device may include only information relevant to the child device.

Example Downlink Event Allocation and Scheduling

FIGS. 4 and 5 show example implementations of at least portions of the schedule 116. Each example 400, 500 shows a plurality of event offsets, each of which may be used for one or more of: timing event(s) (e.g., communications); indicating radio frequencies for use; indicating modulation schemes for use; indicating participants of the event; and/or to indicate other data. In an example, the event offset 404 may indicate an offset time, a radio frequency, a modulation scheme, a mains-powered device, a battery-powered device, and a purpose for the communication (e.g., for the battery-powered device to send natural gas consumption/quantity data).

FIG. 4 shows example techniques for downlink event offset allocation 400. In the example, a period 402 (e.g., a period of time) is configured to include a plurality of event offsets 404-414. In example use of the downlink event allocation 400, a mains-powered device (MPD) transmits over the period of time 402. Within the period of time 402, one or more of the event offsets 404-414 are associated with one or more battery-powered devices (BPDs). The event offsets 404-414 are periods of time that are "offset" from the beginning of the period 402. They indicate "events," such as communication between the MPD and one or more BPDs and/or the reasons for such communications. The BPDs are configured to listen in a periodic manner, such that each BPD turns on its radio and/or other functionality (e.g., processor, memory, etc.) as indicated by one or more event offsets associated with that BPD. In an example, a BPD may participate in a broadcast event timed according to a first event offset. The broadcast event may involve a data transmission from the MPD to a plurality of BPDs. The BPD may participate in a multicast event timed according to a second event offset. The multicast event may involve a plurality of BPDs communicating, in a receive-only or two-way manner, with the MPD. The BPD may participate in a unicast event timed according to a third offset. The unicast event may involve one-on-one, one- or two-way communication, between the MPD and the BPD.

In one example of techniques for downlink event allocation 400, the period of time 402 may be one minute long, although longer and shorter periods could be used in other examples. In the example, each event offset 404-414 could be one-half second in length. In some examples, the entire communication between the MPD and BPD(s) could be concluded within the period of time of the event offset. In other examples, the MPD may communicate with one BPD on one RF frequency at a time that starts at the event offset, but continues beyond the end of the event offset. The MPD may communicate with a second BPD on a second RF frequency at a time that starts at a different event offset, possibly overlapping somewhat in time. Accordingly, a communication may start at the beginning of an event offset, but conclude either before the end of the event offset, at the end of the event offset, or after the end of the event offset.

FIG. 5 shows example techniques for downlink event offset allocation 500. In the example, a period 502 (e.g., a period of time) is configured to include a plurality of event offsets 504-522. The downlink event offset allocation 500 differs from the allocation 400 primarily in that it includes more event offsets. The length of the period of time 402 and may be shorter than, the same as, or longer than, the period of time 502. Similarly, the length of the event offsets 404-414 and may be shorter than, the same as, or longer than, the length of event offsets 504-522. Additionally, each of the event offsets 404-414 may be of the same duration or different durations. Similarly, each of the event offsets 504-522 may be of the same duration or different durations.

Figure 6:
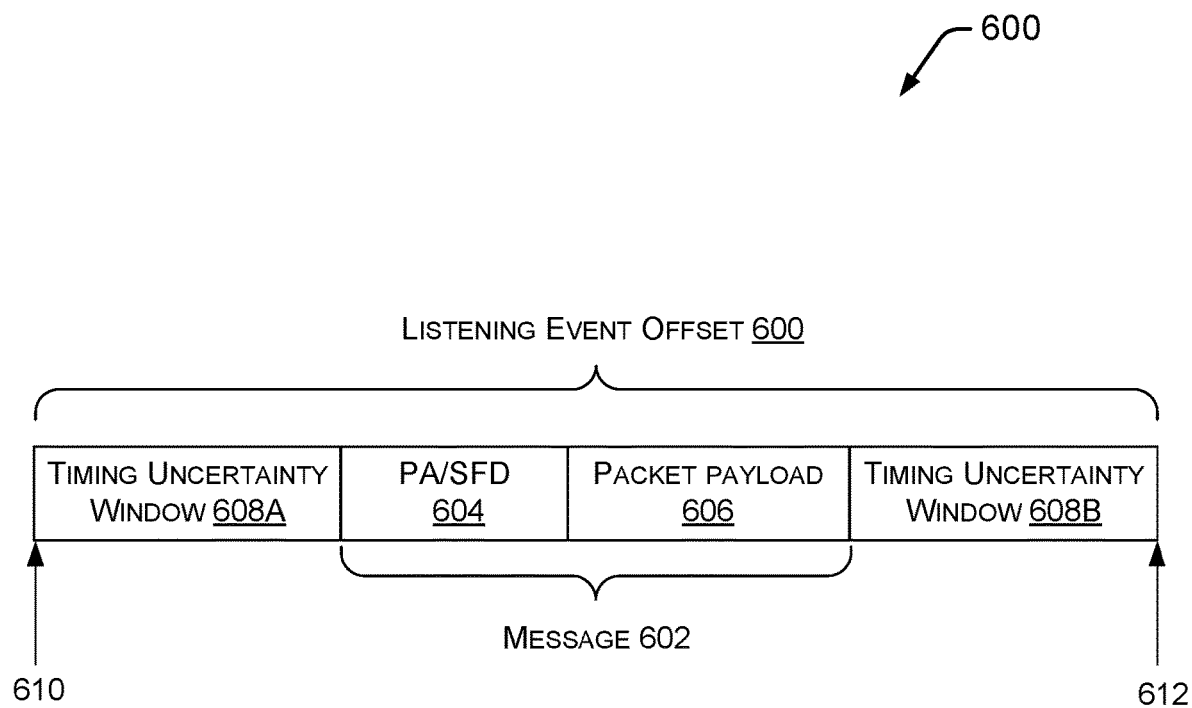
FIG. 6 is a diagram illustrating an example listening event offset.

FIG. 6 illustrates an example listening event offset 600 in which a BPD may listen for messages that are transmitted by other devices, such as MPDs. By listening for messages only at scheduled listening event offsets according to a repeating schedule, the BPD may minimize the amount of battery power that would otherwise be utilized in order to listen for messages at all times. The listening event offset repeating schedule is typically shared, learned and/or negotiated with other devices that may be sending messages to the BPD. This sharing, learning and/or negotiating may occur, for example, in a discovery period during which the BPD is discovering other devices that are already joined to a network, or over time via the use of beacons and/or other communications not specifically for discovery. Discovery may be, for example, via passive discovery beacons that are broadcast by the already-joined devices. As mentioned above, this listening methodology for a BPD to listen for messages from other network devices may conserve battery life as compared to methodologies in which the BPD has its receiver on for long periods. Generally, actively receiving uses less power than transmitting. Furthermore, passively listening generally uses less power than actively receiving.

At FIG. 6, the listening event offset 600 is associated with an offset at which a BPD is listening for a message 602 from another device. The message 602 typically comprises a packet preamble and frame synchronization delimiter (PA/SFD) 604 and a packet payload 606. Due to an uncertainty by the BPD as to when the other device will transmit the message, the listening event offset 600 also includes a timing uncertainty window before (608A) and after (608B) the message 602. The timing uncertainty windows 608A and 608B generally accounts for a mis-synchronization of device clocks as well as accounting for a jitter in the transmission of the message 602. Jitter may include, for example, an uncertainty in a transmitter on time due to characteristics of a transmitter possibly as well an uncertainty in the clock used by the transmitter to time its transmissions.

Particularly given the listening event offset schedules of multiple BPDs, a device sending messages to those BPDs would conventionally implement a methodology to store and then transmit messages to the BPDs at the listening event offsets. The messages being transmitted to the BPDs by a device may, for example, include data of iPv6 packets received by the device, such as via an edge router of a network. In another example, the packets being transmitted to the BPDs by a device may include messages from a security module, such a security module implementing Extensible Authentication Protocol (EAP) over LAN (EAPoL), which is a network port authentication protocol used in IEEE 802.1X (Port Based Network Access Control) developed to give a generic network sign-on to access network resources.

Figure 7:
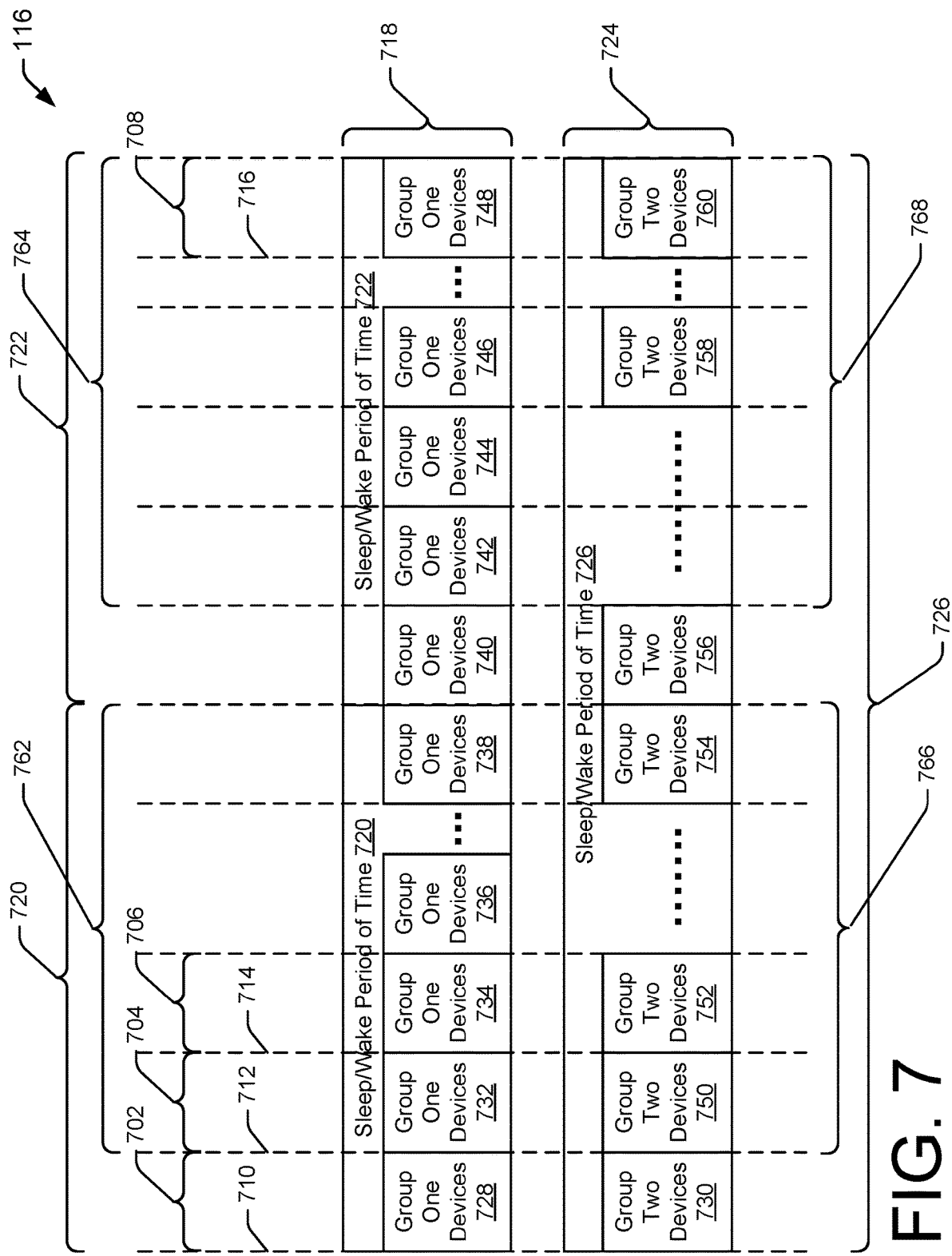
FIG. 7 is a diagram showing example combination of event start-time offsets within a schedule used by two groups of battery-powered devices having different sleep/wake cycle lengths.

FIG. 7 shows an example schedule 116 of event start-time offsets and/or timeslots that may be used to time and/or coordinate communications between a mains-powered device (e.g., device 102 of FIG. 1) and one or more battery-powered devices (e.g., devices 104 of FIG. 1). All or part of the schedule 116 may be used on one or more of the service providers 112, the edge device 108, the mains-powered device 102 and/or the battery-powered device 104.

In the example, the schedule 116 includes a plurality of event timeslots (with representative timeslots 702-708 being labeled). Each timeslot is associated with a respective event start-time offset 710-716. In the example, the timeslots are of uniform duration, i.e., uniform spacing in time. In the example, the schedule governs operation of two groups of devices distinguished by their different sleep/wake cycles. A first group of devices 718 has a sleep/wake cycle 720, 722. A second group of devices 724 has a sleep/wake cycle 726. In the example, two sleep/wake cycles (or activity cycles, etc.) 720, 722 of the first group of devices 718 are completed during the single sleep/wake cycle 726 of the second group of devices 724.

In other examples, groups of devices having different ratios of sleep/wake cycles could be used. For example, if a first group of devices had a sleep/wake cycle of 7 minutes and a second group of devices had a sleep/wake cycle of 11 minutes, a schedule of 77 minutes could be created in which 11 cycles of the first group and 7 cycles of the second group were used to create the schedule. Regardless of length, the schedule may be repeated upon completion, such as for days, months and/or years.

In an example, the sleep/wake period of a device may include a period of time wherein the device "sleeps" (e.g., lower power consumption and radio off), and a period of time wherein the device is "awake" (e.g., higher power consumption and radio on). In some examples, the sleep period is longer than the wake period. For example, the device may sleep for 4 minutes and 59 seconds and be awake for 1 seconds. Numerous other sleep and wake periods are possible and envisioned.

Zero or more devices from among the first group of devices 718 are associated with each timeslot. In an example, a plurality of devices 728 (e.g., 100 battery-powered devices) from among the first group of devices 718 (having a first sleep/wake cycle duration) may be associated a first timeslot 702 following the first event start-time offset 710. Additionally, a plurality of devices 730 from among the second group of devices 724 (having a second sleep/wake cycle duration) may also be associated the first timeslot 702 following the first event start-time offset 710.

In example operation, a mains-powered device may perform a broadcast or multicast transmission during a timeslot. In an example, the mains-powered device may perform a broadcast to the groups of devices 728, 730 in the timeslot 702. In the broadcast, all the devices 728, 730 would wake and tune an appropriate frequency and would receive data during the timeslot 702 that starts at the event start-time offset 710. In examples, some or all the devices 718, 724 may be included in the groups 728, 730.

In examples, some or all the devices 718, 724 may be included in two or more groups. This allows a device to receive a broadcast (e.g., if the device is a member of group 728 or 730) and a unicast (e.g., if the device is a member of another group from among 732-760). Membership in a group may be defined by a schedule, which associates devices with timeslots, RF frequencies, and/or modulation schemes, etc.

In examples, the devices 718 and 724 may be associated with one or more unicast timeslots (e.g., timeslots 704, 706 through 708, etc.). During a unicast timeslot, one or more devices assigned to that timeslot wakes up, tunes a frequency, decodes packet(s) and determines if its identification or identifier has been transmitted. If so, the device continues to decode packets, respond to commands, send packets, etc. If not, the device may return to a sleep mode.

Each timeslot 704, 706 through 708, etc., may have a plurality of devices associated with it in a schedule. In a typical network environment, there are more devices than timeslots. Accordingly, in timeslots associated with unicast transmissions, a plurality of devices will wake, tune, decode and determine if a message is intended for them.

In a schedule, one or more timeslots may be associated with a broadcast (e.g., timeslot 702), while other timeslots may be associated with unicasts (e.g., timeslots 704 through 708). The timeslots utilized for unicast transmissions may be associated with a number of devices. In the example of FIG. 7, timeslot 704 is associated with the group of devices 732 and group of devices 750. The two groups of devices have different sleep/wake periods, but each device from the two groups wakes and uses the timeslot 704. A distribution of the numbers of devices associated with each timeslot utilized for unicast transmissions may be substantially uniform. That is, a similar number of devices is associated with each timeslot. This helps to "smooth" the RF traffic in the network by having each device share a timeslot with similar numbers of other devices.

In an example, a schedule governing aspects of network operation may include dedicated unicast timeslots 762, 764 that may be used for unicast transmissions associated with the first group 718 of devices having a first wakeup/sleep cycle. Unicast timeslots 766, 768 may be used for unicast transmissions associated with the second group 724 of devices having a second wakeup/sleep cycle. Each timeslot in the groups of timeslots 762, 764, 766, 768 is associated with a number of devices in the network that is substantially similar to other timeslots in the groups. Accordingly, a distribution of network devices associated with each timeslot within groups 762, 764, 766, 768 of dedicated unicast timeslots is substantially uniform. And a such a distribution of devices associated with the timeslots, that is, numbers of devices associated with each timeslot, may be made in a manner such that a variance of the distribution is held below a threshold value. In an example, the number of devices associated with each timeslot may be allowed to differ by only "n" devices, wherein "n" devices. The "n" devices may be a fraction of the average number of devices associated with each timeslot. In an example, 80 to 85 devices may be associated with each timeslot. Other examples may be different, but the variance of the distribution of numbers of devices associated with each timeslot may be held under a desired threshold.

In an example, the threshold value may be selected as a compromise between the need to move devices to alternative timeslots and the need to prevent some devices from being assigned to an overly large group of devices that shares a timeslot.

Example Methods

In some examples of the techniques discusses herein, the methods of operation may be performed by one or more application specific integrated circuits (ASIC) or may be performed by a general-purpose processor 202 utilizing software defined in computer readable media. In the examples and techniques discussed herein, the memory 212 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

FIGS. 8 through 13 are flow diagrams showing an example processes which are representative of techniques for use in downlink event offset allocation. The processes may, but need not necessarily, be implemented in whole or in part by the mains-powered device 200 and/or the battery-powered device 300, within a network (e.g., network 100).

Figure 8:
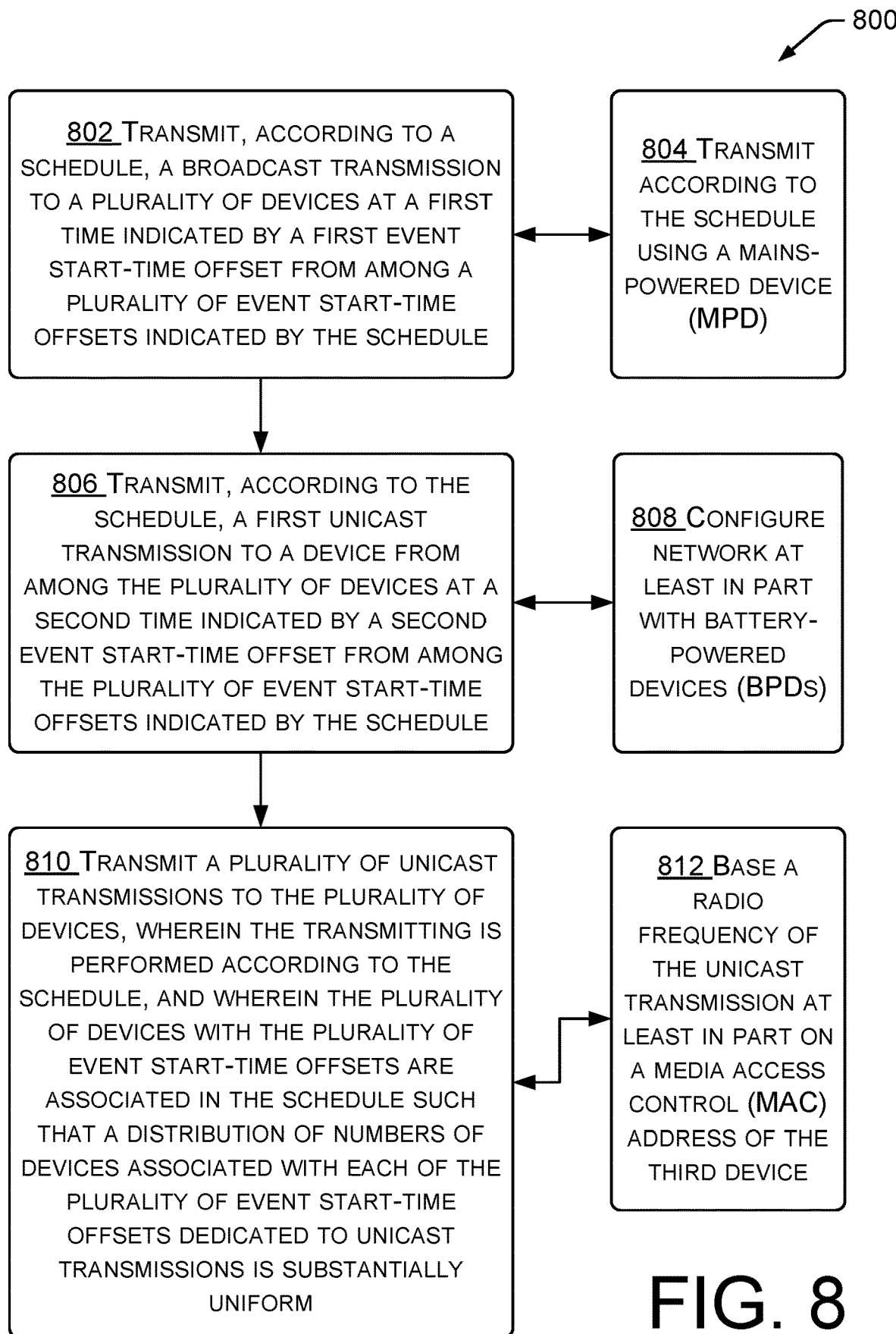
FIG. 8 is a flow diagram showing example techniques for communication with a plurality of battery-powered devices (BPDs) using an event offset associated with each BPD within a period of time.

FIG. 8 shows example techniques 800 by which multicast transmission(s) may be sent according to timing based at least in part on one or more event offsets. In some example implementations, battery-powered devices may be organized into one or more groups. The groups may be based on a technology used by the battery-powered devices, such as an RF frequency used, a modulation scheme used, a functionality of the battery-powered devices (e.g., gas meters, water meters, etc.), and/or other factors.

In an example, the groups may be based at least in part on a wakeup cycle of the battery-powered devices. A mains-powered device may send multicast and/or broadcast transmissions to one or more groups of battery-powered devices based at least in part on timing indicated by a respective one or more event offsets.

In a first example, the mains-powered device may send a broadcast transmission using a first timeslot following a first event offset including information of interest to water meters having a first wakeup cycle time, which may be configured to use a first RF modulation scheme and frequency. In a second example, the mains-powered device may send a broadcast transmission using a second timeslot following a second event offset including information of interest to gas meters having a second wakeup cycle time, which may be configured to use a same or different RF modulation scheme and frequency. In a third example, the mains-powered device may send unicast messages during each of a plurality of dedicated unicast timeslots. The network devices may be assigned to dedicated unicast timeslots in a substantially uniform manner, and a variance of a distribution of numbers of devices assigned to timeslots may be held under a desired threshold by avoiding assignment of too many or too few devices to each timeslot.

In the example of block 802, a device transmits (e.g., according to a schedule) a broadcast transmission to a plurality of devices at a first time indicated by a first event start-time offset from among a plurality of event start-time offsets indicated by the schedule. In the example of block 804, the devices transmitting and/or receiving data according to the schedule may be a mains-powered device (MPD) and/or a battery-powered device. In some example, a mains-powered device may send software updates, scheduling information, commands, and/or other data to battery-powered devices. Battery-powered devices may send metering data or other information to the mains-powered device.

In the example of block 806, a first unicast transmission may be transmitted to a device from among the plurality of devices at times, channels, etc. indicated by the schedule. In the example, the transmission may be made at a second time indicated by a second event start-time offset from among the plurality of event start-time offsets indicated by the schedule. In the example of block 808, the devices of the plurality of devices are battery-powered devices (BPDs).

In the example of block 810, a plurality of transmissions (e.g., unicast transmissions) may be transmitted to the plurality of devices (e.g., battery-powered devices). In the example, the transmitting may be performed according to the schedule. In the example, the plurality of devices with the plurality of event start-time offsets (or plurality of timeslots) are associated in the schedule such that a distribution of numbers of devices associated with each of the plurality of event start-time offsets dedicated to unicast transmissions is substantially uniform.

Thus, each timeslot in the schedule is used by, and/or is associate with, approximately the same number of devices as any other timeslot. The difference in the number of devices associated with each timeslot of the plurality of timeslots may be constrained to be within a threshold value (in absolute terms or as a percentage) of the number of devices associated with any other timeslot in the schedule. Alternatively, the variance of the number of devices attached to each timeslot of the plurality of timeslots in the schedule may be required to be below a threshold value. Other means may be used as desired to measure and/or enforce the uniformity of the number of devices associated with each timeslot following each event start-time offset.

In the example of block 812, a second unicast transmission may be sent to a second device at a time indicated by an event start-time offset (or appropriate timeslot). A radio frequency of the second unicast transmission may be based at least in part on a media access control (MAC) address of the third device.

Figure 9:
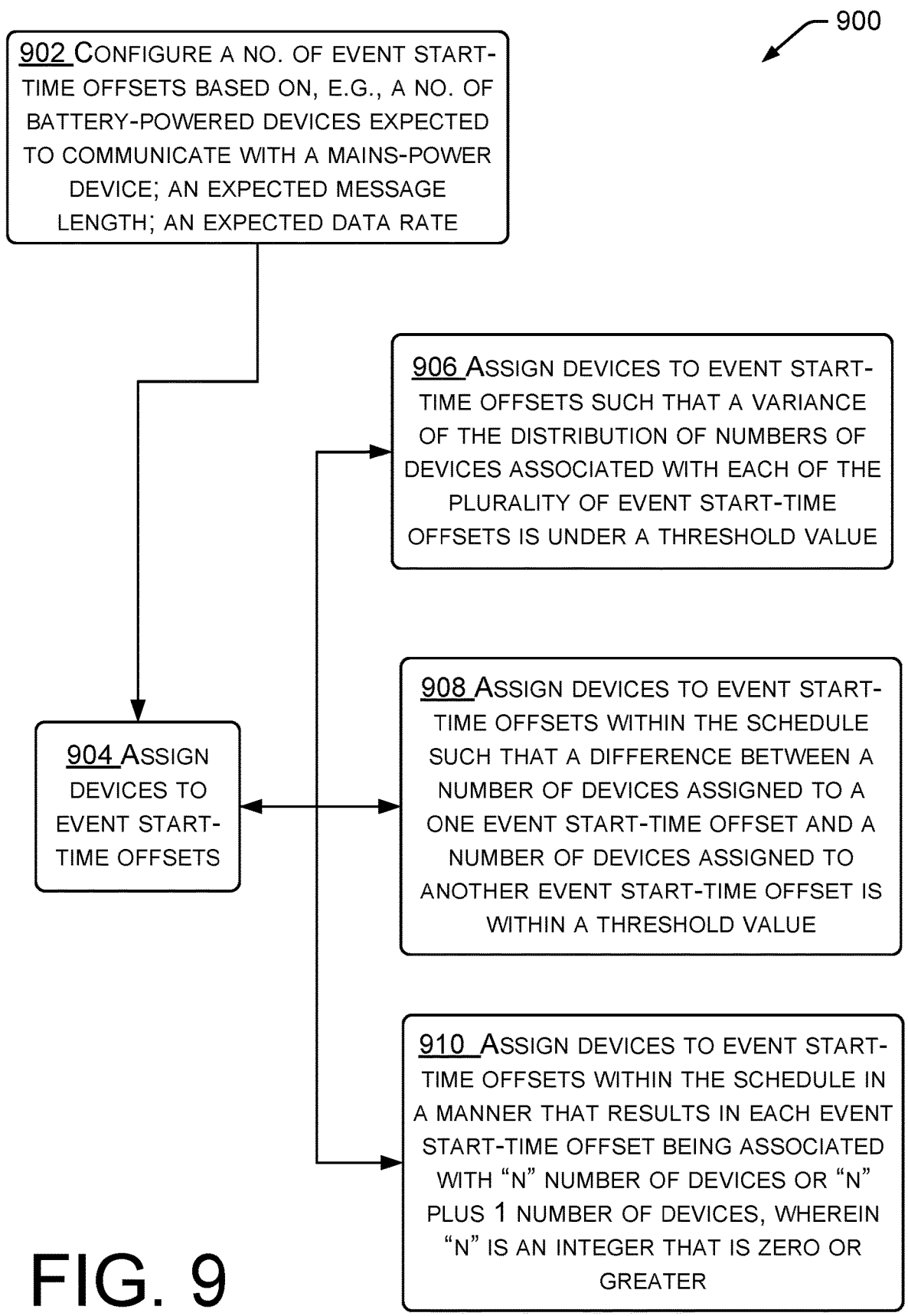
FIG. 9 is a flow diagram showing example techniques for selection and/or adjustment of a number of event offsets to be used within a period of time.

FIG. 9 shows example techniques 900 by which a duration of timeslots is determined, i.e., a spacing of event start-time offsets is determined. Additionally, FIG. 9 shows an example by which devices (e.g., battery-powered devices) are assigned to timeslots, during which that can tune in and determine if a message is directed to them. Three example techniques are presented, which measure and/or enforce the substantial uniformity of the number of devices associated with each of the plurality of timeslots.

At the example of block 902, a number of event start-time offsets (i.e., timeslots) may be determined. The timeslots will segment a sleep/wake cycle of a battery-powered device type. The number of timeslots may be based on one or more factors, including a number of battery-powered devices expected to communicate with a mains-powered device, expected message lengths in the communications, an expected data rate, and/or other factors according to an application in a network.

At block 904, devices are assigned to the timeslots within the sleep/wake cycle of the timeslots as determined at block 902. In the example of block 906, a number of devices is assigned to each timeslot (e.g., dedicated unicast timeslot, used only for unicast transmissions) so that a variance of the numbers of devices assigned to timeslots is less than a threshold value.

Alternatively or additionally, at block 908 a number of devices is assigned to each timeslot (e.g., dedicated unicast timeslot) so that a number of devices (either in absolute terms or expressed as a percentage) is less than a threshold value. In examples, no timeslot would have more than a threshold number of devices more or less than any other timeslot, or no timeslot would have a number of devices that is more or less than another timeslot by a threshold percentage.

In the example of block 910, devices are assigned to timeslot (e.g., dedicated unicast timeslot) to that each timeslot has either "N" devices or "N+1" devices, wherein "N" is an integer that is zero or greater.

Figure 10:
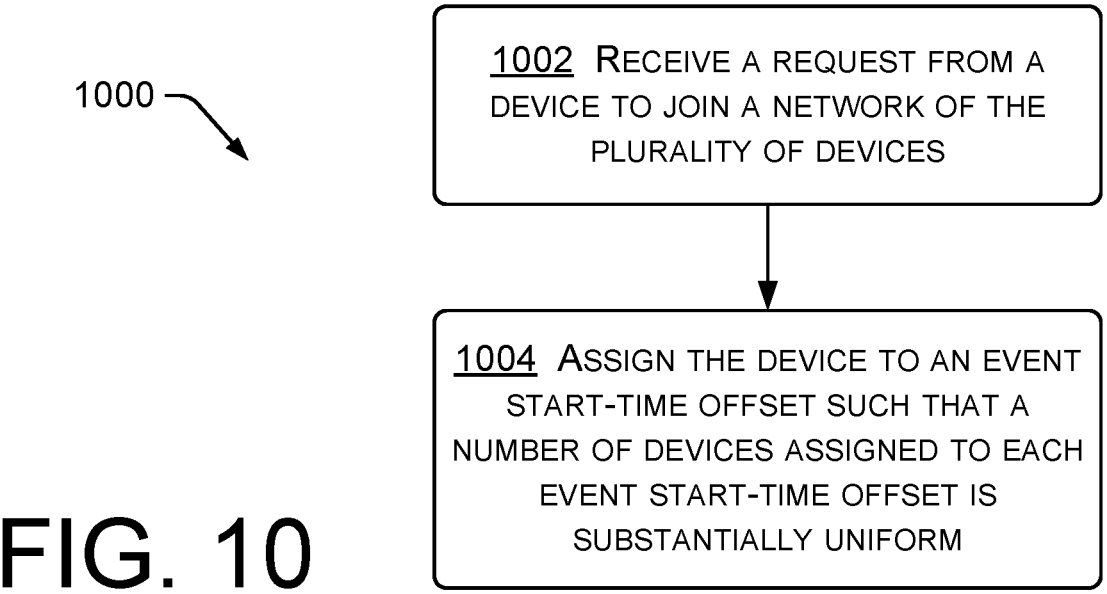
FIG. 10 is a flow diagram showing example techniques for joining a device to a network.

FIG. 10 shows example techniques 1000 by which a device may be joined to a network. At block 1002, a request is received from a device to join a network, which may include one or more mains-powered and battery-powered devices. At block 1004, the device is installed in the network and is associated with an event start-time offset (e.g., a unicast dedicated timeslot) in a manner such that a number of devices assigned to each timeslot is distributed in a substantially uniform manner over the period of the schedule (which may be equal to the sleep/wake cycle of the battery-powered devices in the network).

Figure 11:
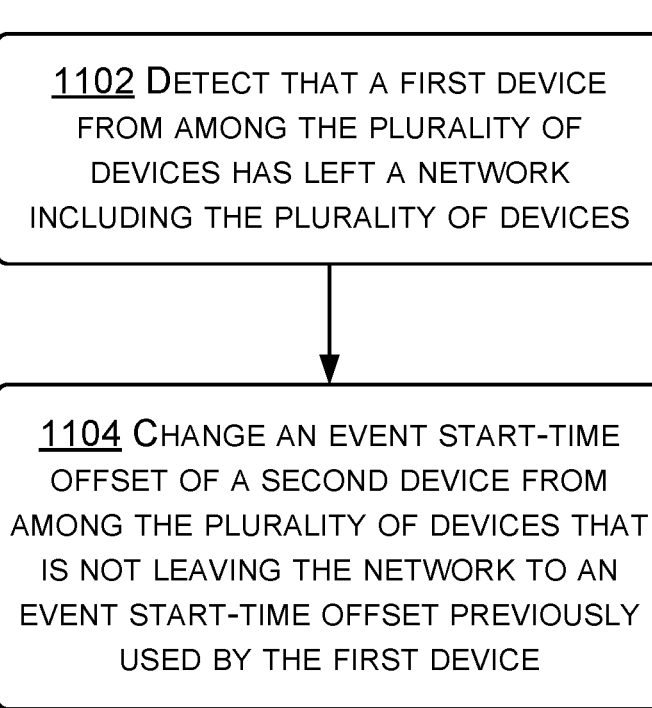
FIG. 11 is a flow diagram showing example techniques for removing a device from a network.

FIG. 11 shows example techniques 1100 by which a device may be removed from the network. At block 1102, the mains-powered device (or another network device) detects that a first device (e.g., a battery-powered device) has left the network. In an example, the battery-powered device reported to the mains-powered device that it was leaving the network. At block 1104, an event start-time offset or timeslot of a second device that is not leaving the network is changed to the timeslot of the device that is left the network. Accordingly, the number of devices associated with the timeslots of the period of the schedule may be altered to increase their uniformity (i.e., to decrease their variance).

Figure 12:
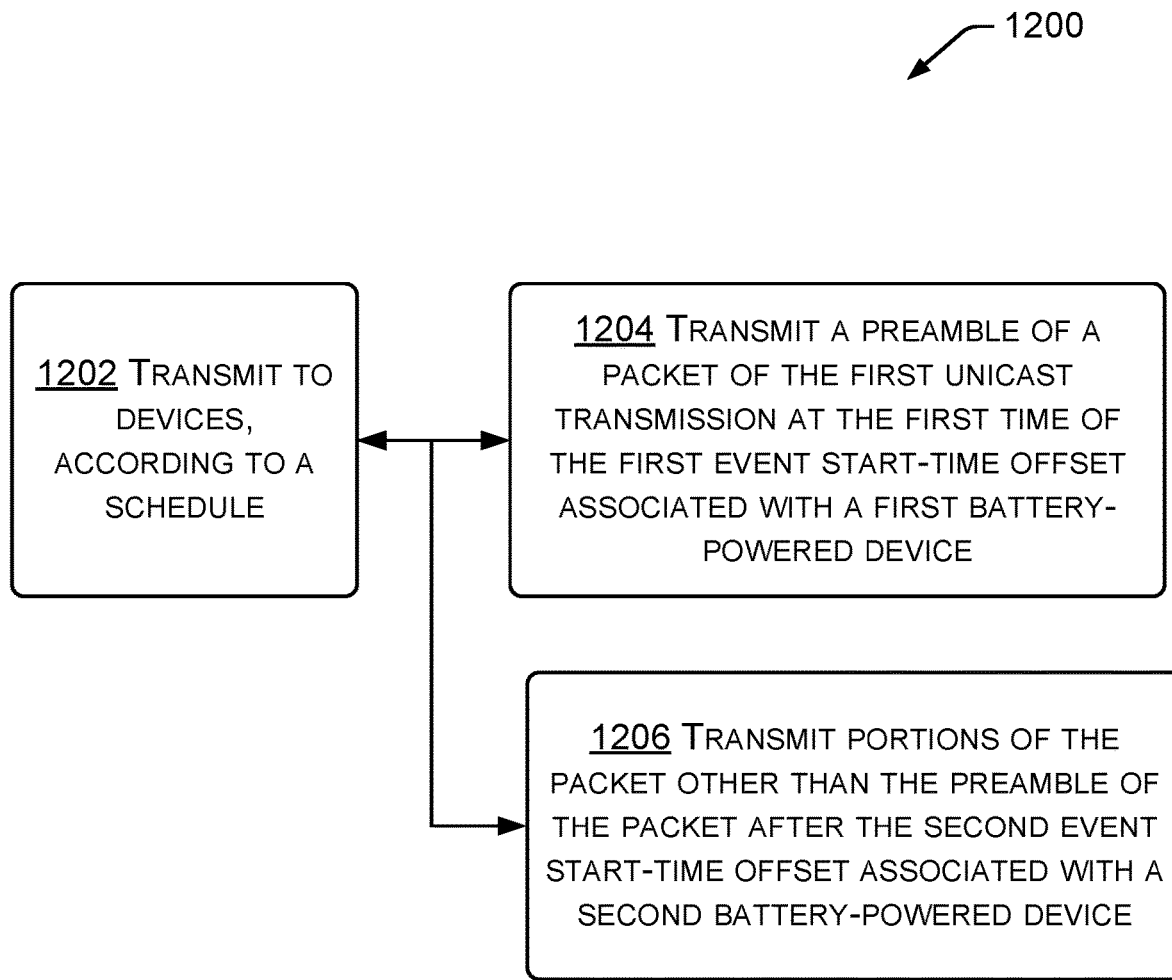
FIG. 12 is a flow diagram showing example techniques for transmitting to devices in a network according to a schedule where messages exceed a length of a timeslot.

FIG. 12 shows example techniques 1200 by which a mains-powered device may communicate with a battery-powered device. In some instances, communication may require more time than is in the timeslot. In some instances, the timeslot is approximately the period of time needed for a packet preamble to be transmitted. In such instances, the mains-powered device and the battery-powered device may communicate for a period that is longer than the timeslot. Other battery-powered devices, waking for their own timeslots, will hear data and not a preamble and/or their ID number. Accordingly, they will not communicate with the mains-powered device until a different iteration of the schedule.

At block 1202, a mains-powered device and a battery-powered device transmit and/or receive data according to a schedule. At block 1204, a preamble of a packet of a first unicast transmission is transmitted during a first timeslot. Devices associated with the timeslot and that begin to decode at the timeslot will recognize the preamble and continue to decode. The packet may include an identification of the device to whom the packet and/or subsequent packets are directed.

At block 1206, other portions of the packet (e.g., data) or subsequently transmitted packets, are transmitted during subsequent timeslots. Other devices that begin to decode at these time(s) will not recognize a preamble and start frame synchronization delimiter (PA/SFD) and will not recognize their device identification. Such devices, realizing that packets are not directed to them, may resume a sleep portion of their respective activity cycles.

Figure 13:
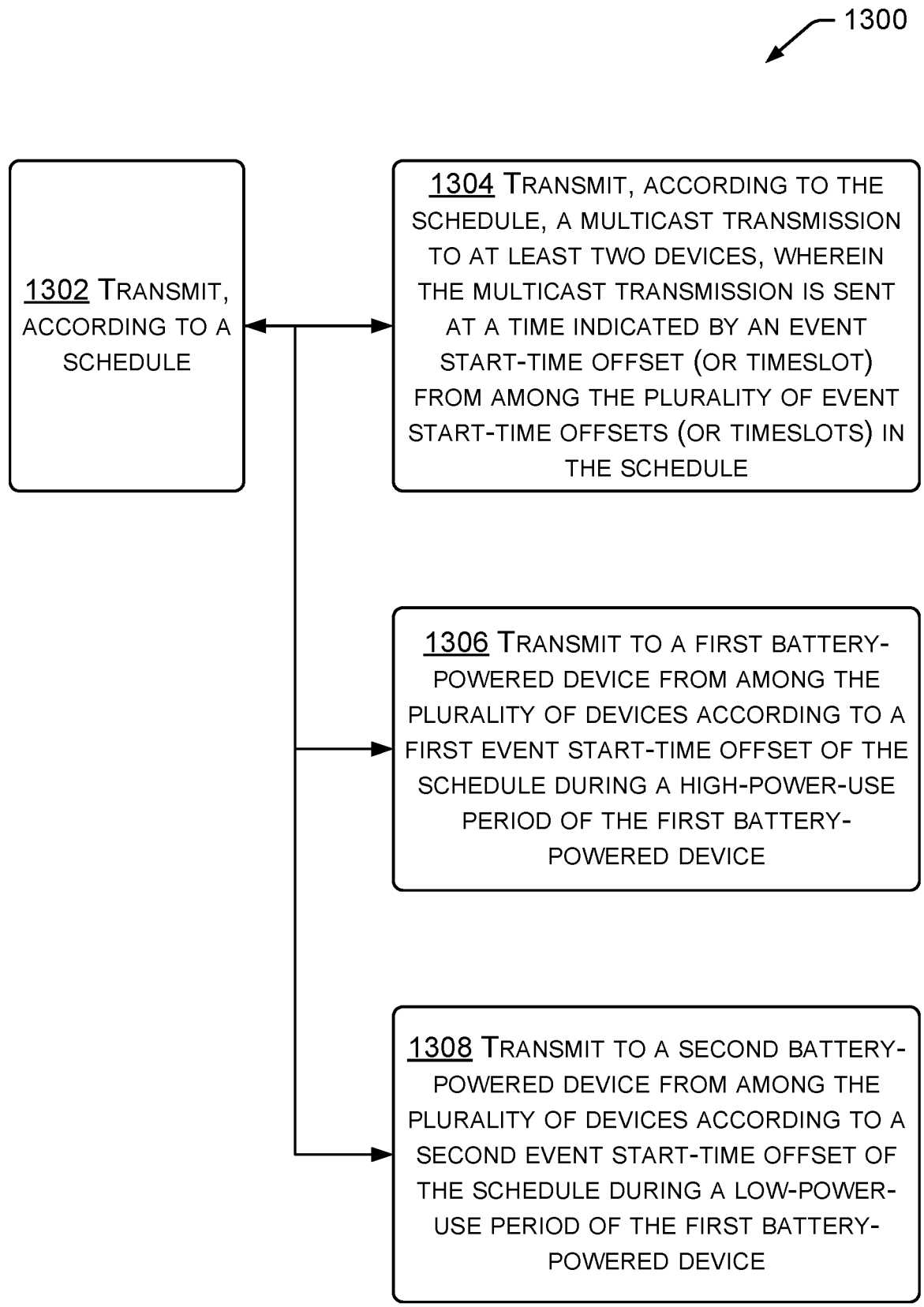
FIG. 13 is a flow diagram showing example techniques for transmitting to devices in a network according to high-power use states and low-power use states.

FIG. 13 shows techniques 1300 for communication between a mains-powered device and one or more battery-powered devices. At block 1302, a transmission (e.g., from a mains-powered device to a battery-powered device) is performed according to a schedule (e.g., schedule 116 seen in FIGS. 1 and 7).

At block 1304, a mains-powered device transmits (and a plurality of battery-powered devices receive), according to the schedule, a multicast transmission to at least two battery-powered devices. In an example, the multicast transmission is sent at a time indicated by an event start-time offset (or timeslot following the offset) from among the plurality of event start-time offsets (or timeslots) in the schedule.

At block 1306, a first battery-powered device from among a plurality of devices communicates (e.g., transmits data to and/or receives data from) the mains-powered device) according to a first event start-time offset of the schedule. The transmission is made during a high-power-use period of the battery-powered device. At block 1308, a second battery-powered device from among the plurality of devices transmits and/or receives according to a second event start-time offset of the schedule during a low-power-use period of the first battery-powered device.

Figure 14:
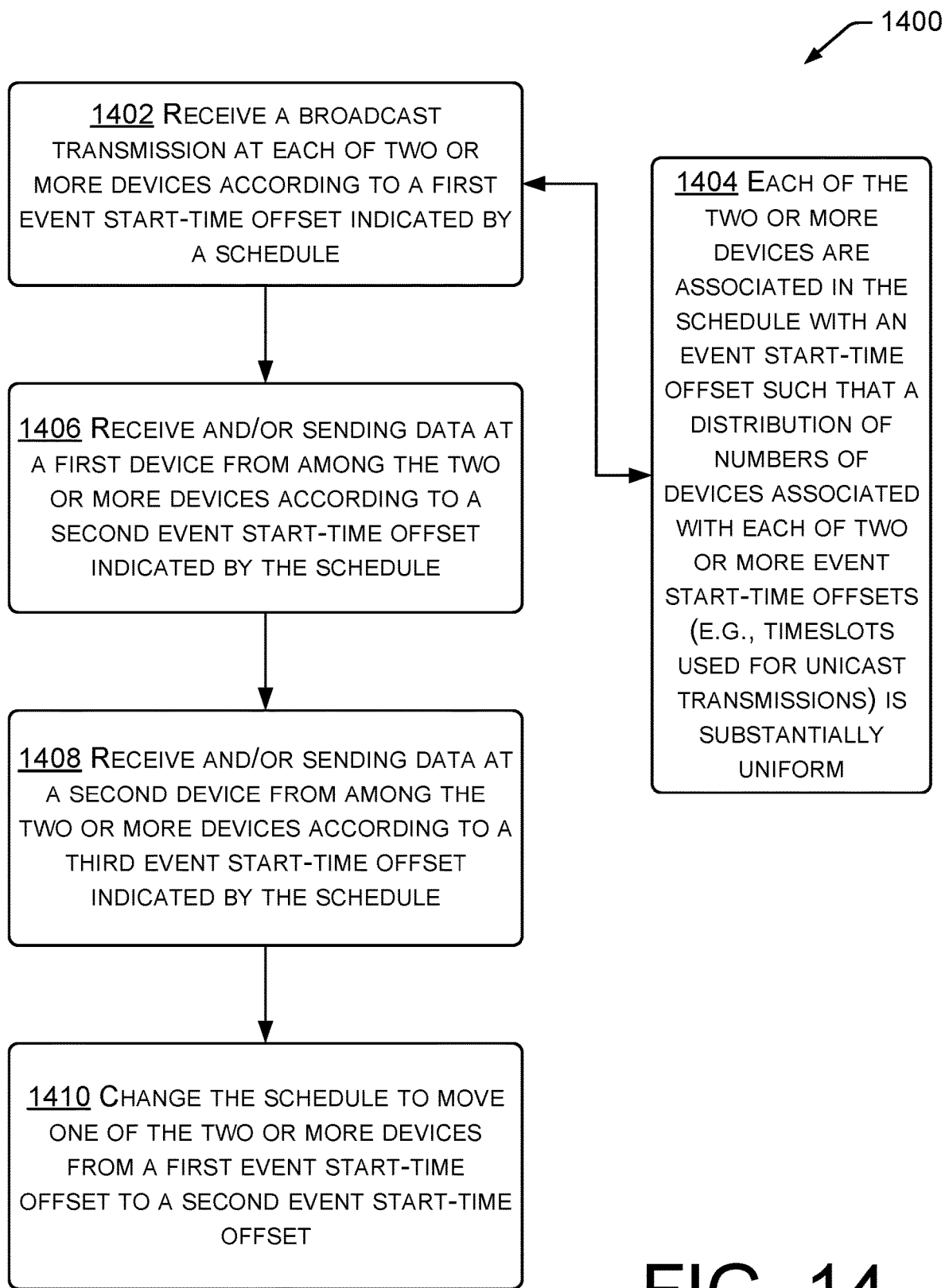
FIG. 14 is a flow diagram showing example techniques for broadcast and unicast events.

FIG. 14 shows example techniques 1400 whereby a plurality of battery-powered devices (BPD) are configured use a schedule to share timeslots and/or spectrum. In the example, a number of devices are associated with timeslots (e.g., timeslots dedicated for use only in unicast transmissions) in a substantially uniform manner. Thus, a substantially similar number of battery-powered devices are associated with each timeslot. Similarly, a variance of the number of devices associated with each timeslot is less than a threshold value.

At block 1402, a broadcast transmission is received at each of two or more devices according to a first event start-time offset indicated by a schedule. At block 1404, each of the two or more devices is associated in the schedule with an event start-time offset (e.g., a timeslot dedicated for unicast transmissions) such that a distribution of numbers of devices associated with each of two or more event start-time offsets is substantially uniform.

At block 1406, data is received and/or sent at a first device from among the two or more devices according to a second event start-time offset indicated by the schedule.

At block 1408, data is received and/or sent at a second device from among the two or more devices according to a second event start-time offset indicated by the schedule.

At block 1410, the schedule may be changed to move at least one of the two or more devices from a first event start-time offset to a second event start-time offset. The move may reduce variance in the number of devices associated with each timeslot.

Figure 15:
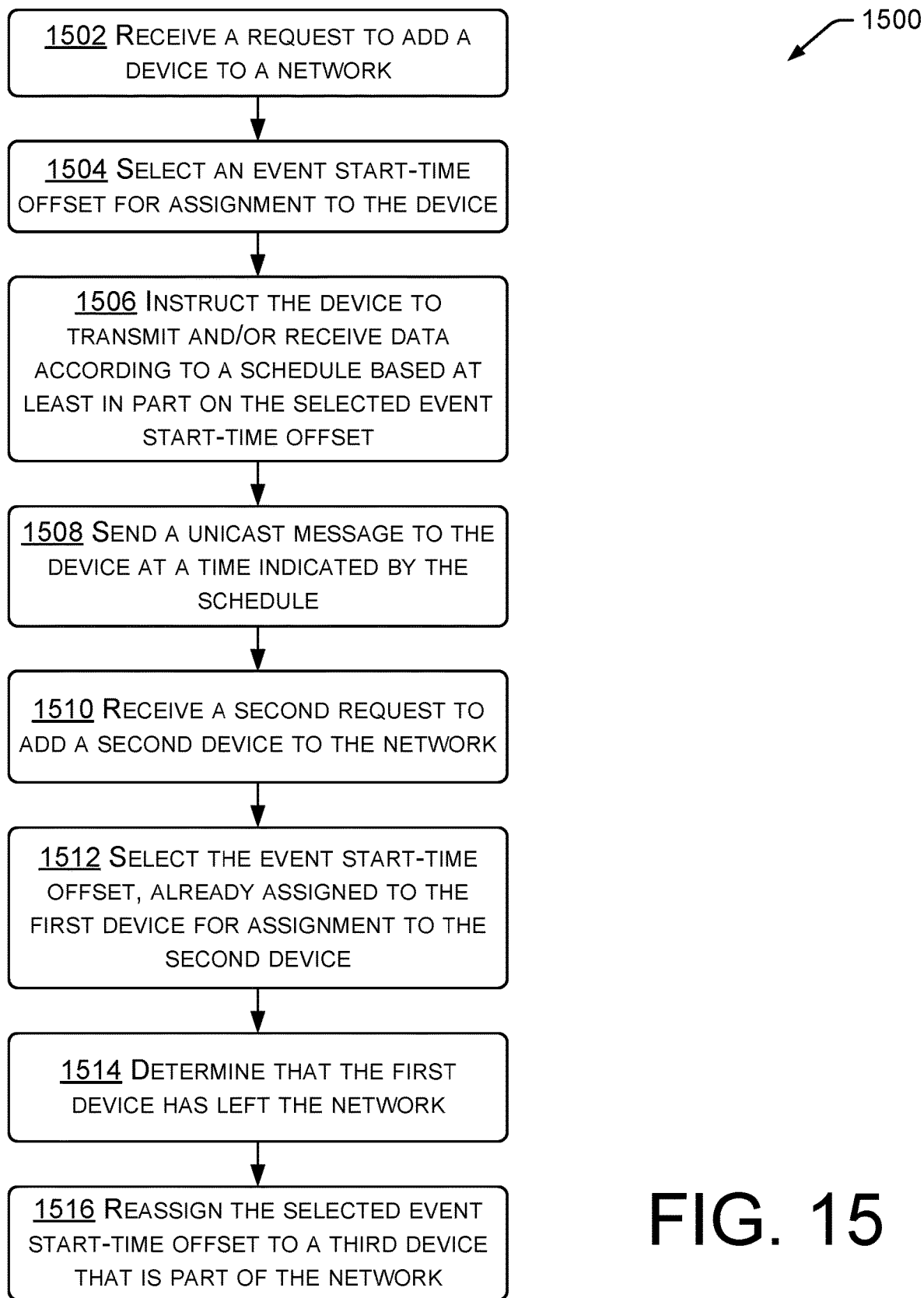
FIG. 15 is a flow diagram showing example techniques for adding devices to a network.

FIG. 15 shows example techniques 1500 whereby a mains-powered device adds node(s) to a network. As a new battery-powered device is connected to the network, it is assigned to an event start-time offset and/or timeslot. At the timeslot, the mains-powered device communicates with the new device. In the example, at blocks 1502 through 1508, a battery-powered device requests to be added to the network, receives a selected timeslot, and communicates on that timeslot. In the example, at blocks 1510 through 1512, a second device is added to the network. If the network contains more devices than timeslots, then a timeslot is assigned, even though it is already assigned to another device. In the example of blocks 1514 through 1516, a device may leave the network and its timeslot may be reassigned to another device. In some examples, each time a timeslot is assigned (or reassigned) the assignment may be made in a manner that keeps a variance of a distribution of numbers of devices assigned to timeslots less than a threshold value.

At block 1502, a request is received to add a device (e.g., a battery-powered device) to a network. The request may come from the battery-powered device itself, of from a network manager, edge device, etc.

At block 1504, an event start-time offset is selected for assignment to the device. Event start-time offsets may be selected in a manner that maintains the variance of the distribution of devices assigned to offsets less than a target threshold.

At block 1506, the battery-powered device is instructed to transmit and/or receive data according to a schedule. The schedule may indicate the selected event start-time offset or associated timeslot.

At block 1508, a unicast message may be sent to the battery-powered device at a time indicated by the schedule.

At block 1510, a second request is received to add a second device to the network.

At block 1512, the event start-time offset, already assigned to the first device, may be selected for assignment to the second device. Accordingly, more than one device may be associated with a timeslot. This allows for more device than there are timeslots to be added to the network.

At block 1514, it may be determined that the first device has left the network. Devices may be added or removed from the network, responsive to changes in customers' locations, numbers, etc.

At block 1516, the selected event start-time offset (e.g., selected at block 1512) may be reassigned to a third device that is part of the network.

Figure 16:
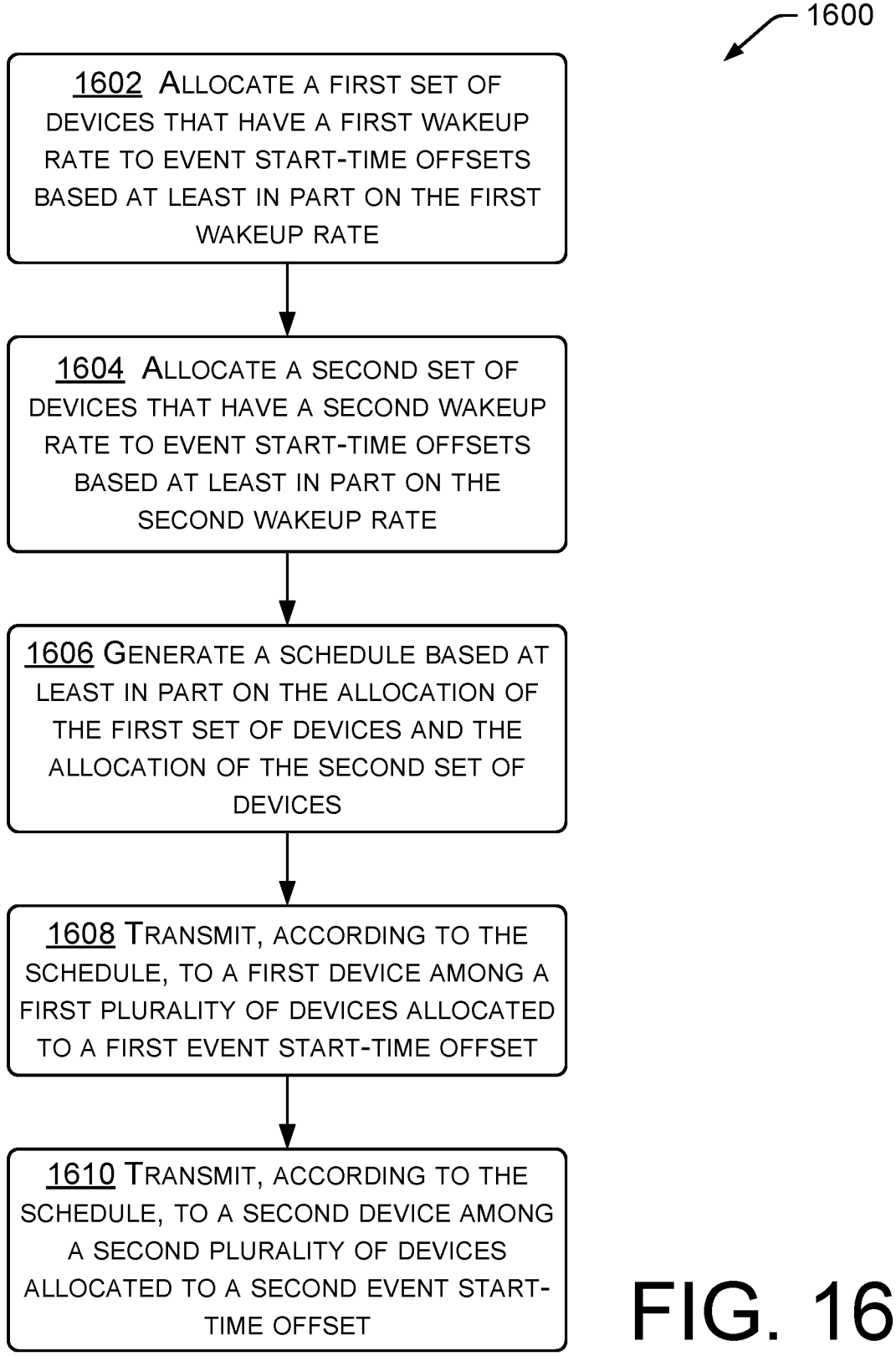
FIG. 16 is a flow diagram showing example techniques for building a schedule of timeslots consistent with two groups of battery-powered devices with different sleep/wake periods.

FIG. 16 is a flow diagram showing example techniques 1600 for building a schedule of event start-time offsets indicating timeslots consistent with two groups of battery-powered devices with different sleep/wake cycle lengths. The techniques 1600 may be utilized by a mains-powered device or other network device.

At block 1602, a first set of devices that have a first wakeup rate are allocated to event start-time offsets based at least in part on the first wakeup rate.

At block 1604, a second set of devices that have a second wakeup rate are allocated to event start-time offsets based at least in part on the second wakeup rate. In an example, the first and second sets of devices are battery-powered devices.

At block 1606, a schedule is generated based at least in part on the allocation of the first set of devices and the allocation of the second set of devices.

At block 1608, a mains-powered device transmits according to the schedule to a first device among a first plurality of battery-powered devices allocated to a first event start-time offset.

At block 1610, the mains-powered device transmits according to the schedule to a second device among a second plurality of devices allocated to a second event start-time offset.

Figure 17:
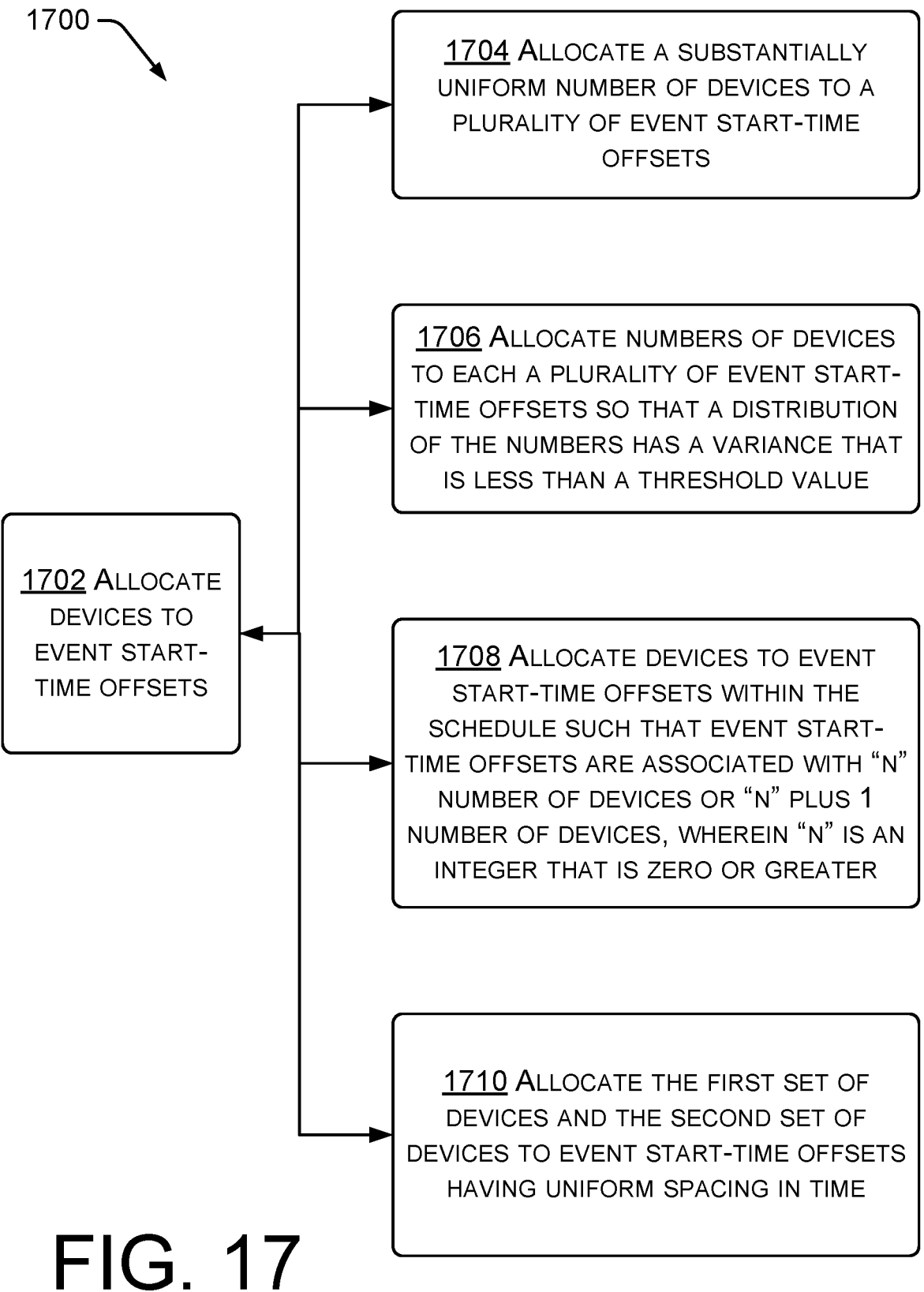
FIG. 17 is a flow diagram showing four example techniques for allocating devices to particular event start-time offsets (i.e., timeslots).

FIG. 17 is a flow diagram showing four example techniques 1700 for allocating devices to particular event start-time offsets (i.e., timeslots). At block 1702, a device (e.g., a mains-powered device, server in a remote location, etc.) allocates devices to event start-time offsets, thereby associating battery-powered devices to timeslots for communication.

Block 1704 shows a first example allocation, wherein a substantially uniform number of devices are allocated to a plurality of event start-time offsets. Thus, a distribution of the numbers of devices associated with each of a plurality of timeslots is substantially uniform.

Block 1706 shows a second example allocation, wherein numbers of devices are allocated to each a plurality of event start-time offsets so that a distribution of the numbers has a variance that is less than a threshold value.

Block 1708 shows a third example allocation, wherein devices are allocated to event start-time offsets within the schedule such that event start-time offsets are associated with "n" number of devices or "n" plus 1 number of devices, wherein "n" is an integer that is zero or greater. Such an allocation prevents some timeslots from being associated with significantly more devices than other timeslots.

Block 1710 shows a fourth example allocation, wherein 1710 the first set of devices and the second set of devices are allocated to event start-time offsets having uniform spacing in time. That is, each event start-time offset may indicate the beginning of a timeslot, and the timeslots are of uniform duration. Accordingly, battery-powered devices having longer or shorter sleep/wake periods are all associated with timeslots of uniform duration.

Figure 18:
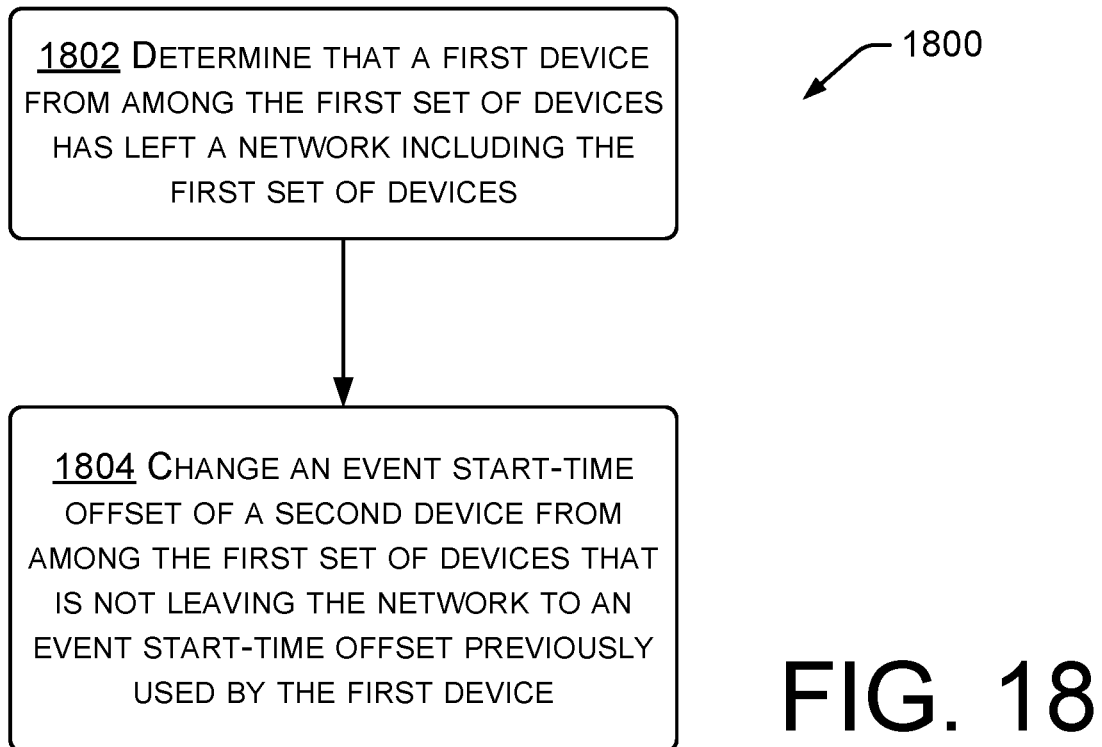
FIG. 18 is a flow diagram showing example techniques for removing devices from a network.

FIG. 18 is a block diagram showing example techniques 1800 for removing devices from a network, and responsive to the removal, changing an event start-time offset of a different device to maintain the substantial uniformity of the distribution of devices over the offsets. In an example, the schedule may be changed to move one of the two or more devices from a first event start-time offset to a second event start-time offset. In the example, the changing of the schedule is performed in a manner that reduces a variance of the distribution of numbers of devices associated with each of a plurality of event start-time offsets.

At block 1802, it is determined that a first device from among a first set of devices has left or will leave a network including the first set of devices. At block 1804, an event start-time offset of a second device from among the first set of devices that is not leaving the network is changed to an event start-time offset previously used by the first device. Accordingly, when a device leaves a network, it may be advantageous to have a different device, still on the network, move from its timeslot to the timeslot of the departing device. Such a move may result in less variance in a distribution of numbers of devices associated with timeslots in a schedule. This results in better use of available radio frequency spectrum.

Figure 19:
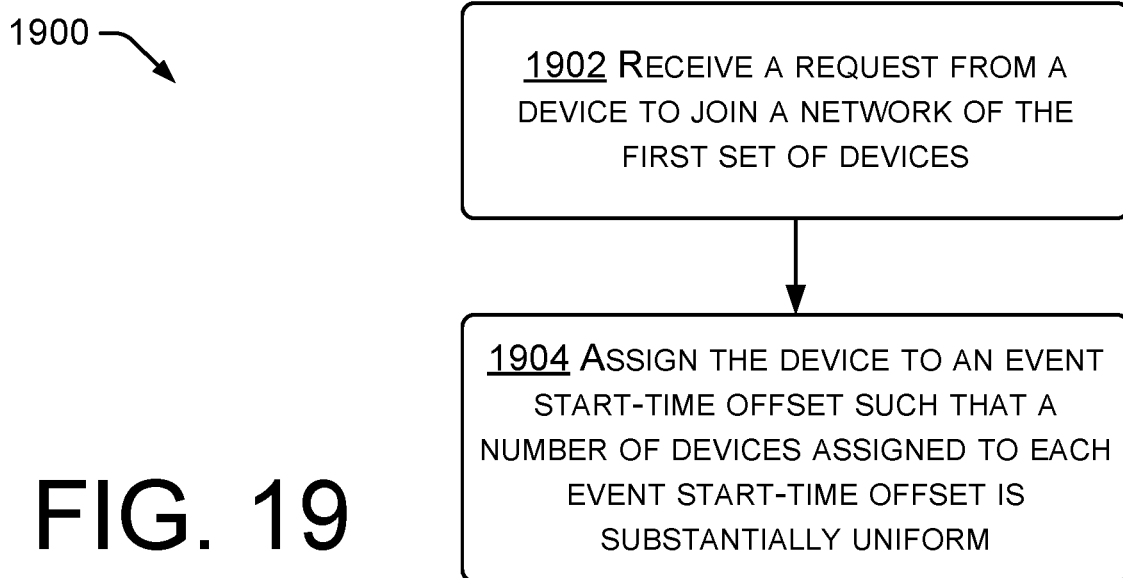
FIG. 19 is a flow diagram showing example techniques for adding a device to a network.

FIG. 19 is a block diagram showing example techniques 1900 for adding a device to a network. At block 1902, a request is received from a device to join a network of the first set of devices. At block 1904, the device may be assigned to an event start-time offset such that a distribution of numbers of devices assigned to each event start-time offset is substantially uniform.

Figure 20:
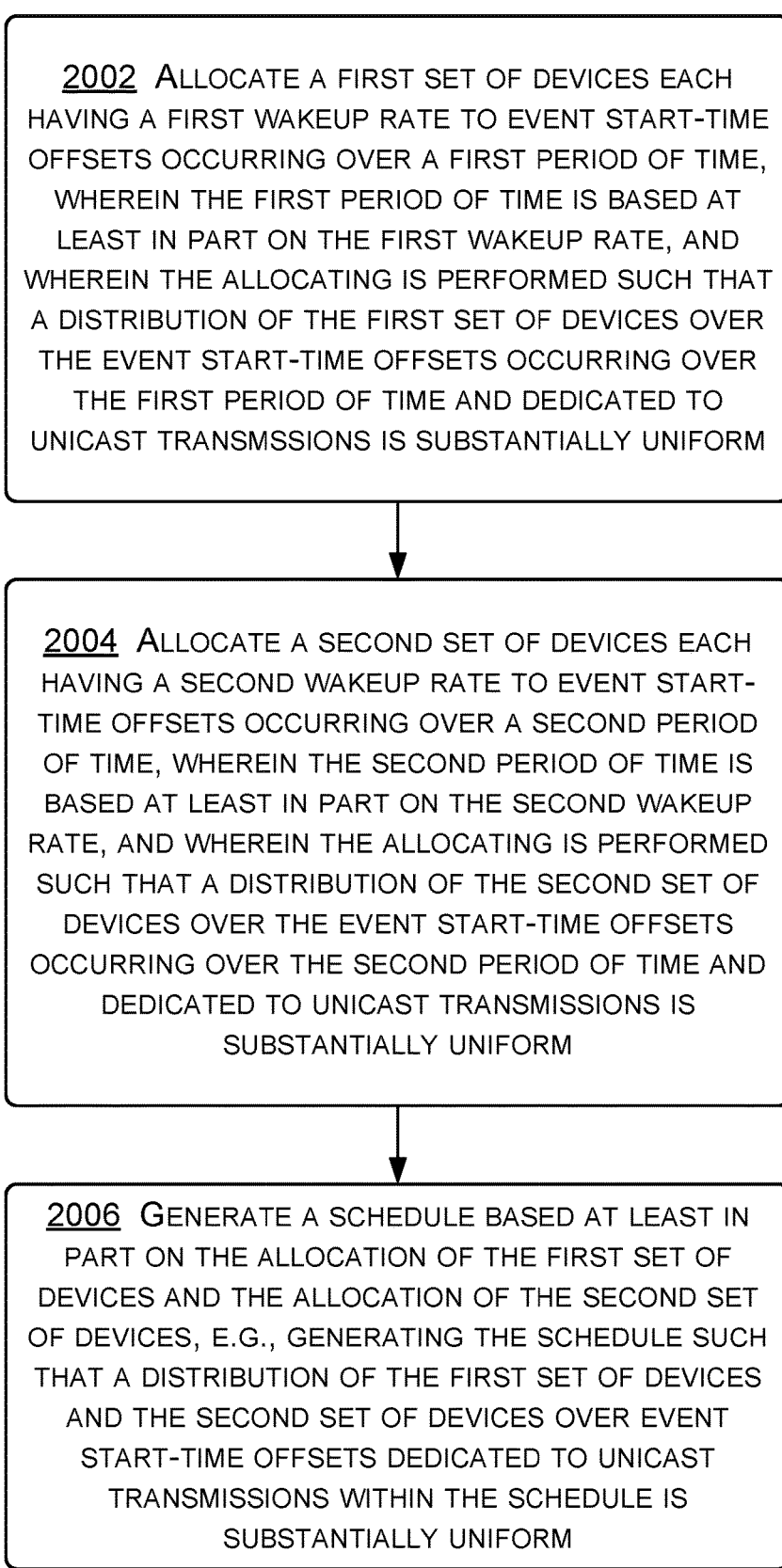
FIG. 20 is a flow diagram showing example techniques for constructing a schedule used for communication with groups of battery-powered devices (BPDs) having different activity cycles of wake (higher-power use) and sleep (lower-power use) periods.

FIG. 20 shows example techniques 2000 for constructing a schedule used communication with two or more groups of battery-powered devices (BPDs), each group having activity cycles of different lengths of wake (higher-power use) and sleep (lower-power use) periods.

At block 2002, each device of a first set of devices has a first wakeup rate and/or activity cycle. The devices of the first set of devices are allocated to event start-time offsets (e.g., timeslots) occurring over a first period of time. In an example, the first period of time is based at least in part on the first wakeup rate. In examples, the first period of time may be equal to an activity cycle including an active phase and a sleep phase. The allocation may be performed such that a distribution of the first set of devices over the event start-time offsets occurring over the first period of time is substantially uniform. That is, a substantially uniform numbers of devices are assigned to each timeslot. Thus, some timeslots do not have significantly more or less assigned devices. This tends to more efficiently use radio frequency spectrum.

In an example where one or more of the timeslots is associated with a broadcast or multicast event associated with a large number of network devices, the other timeslots would be associated with network devices in a substantially uniform manner. Thus, dedicated unicast timeslots would be configured with substantially the same number of devices assigned to each such timeslot. In an example, a variance of a distribution of the numbers of devices associated with timeslots would be held under a threshold value, such as by assigning devices to timeslots so that the number of devices assigned to each timeslot was approximately the same. As seen in the example of FIG. 7, each of the dedicated unicast timeslots 762, 764 are assigned approximately the same number of devices, and the distribution of devices is substantially uniform over the timeslots.

At block 2004, each device of a second set of devices has a second wakeup rate and/or activity cycle, different from the first activity cycle. The devices of the second set of devices are allocated to event start-time offsets occurring over a second period of time. The allocation is performed in a manner similar to that of the allocation of block 2002.

At block 2006, a schedule is generated based at least in part on the allocation of the first set of devices and the allocation of the second set of devices. In an example operation, network devices may repeatedly use the schedule to time and direct (e.g., RF frequency, modulation scheme, etc.). In an example, if the schedule governs fifteen minutes of communication, it may be repeated four times an hour and 96 times a day.

In an example, the schedule is generated such that a distribution of the first set of devices and the second set of devices within dedicated unicast timeslots of the schedule is substantially uniform over the duration of the schedule. The schedule may be generated by combining two or more schedules associated with respective two or more groups of devices, each group of devices associated with a particular sleep/wake cycle. Each of the component schedules may be created so that a distribution of numbers of devices associated with dedicated unicast timeslots is substantially uniform. Combining two or more such component schedules, having timeslots of equal duration and temporal alignment, would yield a combined schedule having similar substantial uniformity.

The duration of the schedule may be a whole number multiple of both of the activity cycles of the two sets of devices. In an example, if first set of devices has an activity cycle of 2 minutes (including both sleep and wake portions) and the second set of devices has an activity cycle of 3 minutes, the schedule may have a duration of 6 minutes to include three cycles of the devices of the first set and two cycles of devices of the second set. Referring to the example of FIG. 7, two activity cycles 720, 722 of a first group of devices and one activity cycle 726 of a second group of devices 724 are used to form the schedule 116.

The schedule does not have to be limited to cover a particular length of time. Alternatively, the schedule may be generated in real time, as it is used.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method, comprising:
    transmitting, according to a schedule, a broadcast transmission to a plurality of devices at a first event start-time offset from among a plurality of event start-time offsets indicated by the schedule;
    transmitting, according to the schedule, a first unicast transmission to a device of the plurality of devices at a second time indicated by a second event start-time offset from among the plurality of event start-time offsets indicated by the schedule; and
    transmitting a plurality of unicast transmissions to the plurality of devices, wherein the transmitting is performed according to the schedule, and wherein a distribution of numbers of devices associated with event start-time offsets dedicated to unicast transmissions is substantially uniform;
    detecting that a first device of the plurality of devices has left a network of the plurality of devices; and
    changing an event start-time offset of a second device of the plurality of devices that is not leaving the network to an event start-time offset previously used by the first device.

2. The method of claim 1, additionally comprising:
    assigning devices of the plurality of devices to event start-time offsets such that a variance of the distribution of numbers of devices associated with each of the plurality of event start-time offsets is under a threshold value.

3. The method of claim 1, additionally comprising:
assigning devices of the plurality of devices to event start-time offsets within the schedule such that a difference between a number of devices assigned to a third event start-time offset and a number of devices assigned to a fourth event start-time offset is within a threshold value.

4. The method of claim 1, additionally comprising:
assigning devices of the plurality of devices to event start-time offsets within the schedule in a manner that results in each event start-time offset being associated with "n" number of devices or "n" plus 1 number of devices, wherein "n" is an integer that is zero or greater.

5. The method of claim 1, wherein a number of event start-time offsets defined within the schedule is based at least in part on one or more factors, comprising:
a number of battery-powered devices expected to communicate with a mains-powered device;
an expected message length used in communications between the battery-powered devices and the mains-powered device;
an expected data rate used by the battery-powered devices and the mains-powered device.

6. The method of claim 1, additionally comprising:
transmitting, according to the schedule, a multicast transmission to at least two devices of the plurality of devices, wherein the multicast transmission is sent at a third time indicated by a third event start-time offset from among the plurality of event start- time offsets.

7. The method of claim 1, additionally comprising:
receiving a request from a device to join the network; and
assigning the device requesting to join the network to an event start-time offset such that a number of devices assigned to each event start-time offset is substantially uniform.

8. The method of claim 1, additionally comprising:
receiving requests from additional devices to join the network;
assigning the additional devices to event start-time offsets within the schedule in a manner that results in each event start-time offset being associated with "n" number of devices or "n" plus 1 number of devices, wherein "n" is an integer that is zero or greater.

9. The method of claim 1, wherein:
a device transmitting according to the schedule is a mains-powered device (MPD); and
devices of the plurality of devices are battery-powered devices (BPDs).

10. The method of claim 1, additionally comprising:
transmitting a preamble of a packet of the first unicast transmission at the first event start-time offset associated with a first battery-powered device of the plurality of devices; and
transmitting portions of the packet other than the preamble of the packet after the second event start-time offset associated with a second battery-powered device of the plurality of devices.

11. The method of claim 1, additionally comprising:
sending a second unicast transmission to another device of the plurality of devices at a time indicated by a third event start-time offset;
wherein a radio frequency of the second unicast transmission is based at least in part on a media access control (MAC) address of the third device.

12. The method of claim 1, additionally comprising:
transmitting to a first battery-powered device of the plurality of devices according to a first event start-time offset of the schedule during a high-power-use period of the first battery-powered device; and
transmitting to a second battery-powered device of the plurality of devices according to a second event start-time offset of the schedule during a low-power-use period of the first battery-powered device.

13. The method of claim 1, additionally comprising:
prior to changing the event start-time offset of the second device, receiving a request to join the network from the second device.

14. A method, comprising:
receiving a broadcast transmission at each of two or more devices according to a first event start-time offset indicated by a schedule;
receiving data in a first unicast transmission at a first device from among of the two or more devices according to a second event start-time offset indicated by the schedule; and
receiving data in a second unicast transmission at a second device from among of the two or more devices according to a third event start-time offset indicated by the schedule;
wherein:
the schedule associates numbers of devices to event start-time offsets dedicated to unicast transmissions in a substantially uniform manner,
a battery-powered device of the two or more devices communicates according to an event start-time offset of the schedule during a high-power-use period of the battery- powered device, and
the battery-powered device alternates high-power-use periods and low-power-use periods according to event start-time offsets.

15. The method of claim 14, wherein:
at least two battery-powered devices of the two or more devices are associated with a same event start-time offset within the schedule; and
at the same event start-time offset, each of the at least two battery-powered devices determines if a message is available.

16. The method of claim 14, additionally comprising:
changing the schedule to move one of the two or more devices from the first event start-time offset to the second event start-time offset;
wherein the changing of the schedule reduces a variance of the distribution of numbers of devices associated with each of a plurality of event start-time offsets.

17. The method of claim 14, wherein receiving the broadcast transmission at each of two or more devices according to the first event start-time offset indicated by the schedule includes receiving the broadcast transmission from a mains-powered device.

18. A method, comprising:
receiving a request to add a first device to a network;
selecting an event start-time offset for assignment to the first device, wherein the selected event start-time offset is selected such that a distribution of numbers of devices associated with each of a plurality of event start-time offsets is substantially uniform;
instructing the first device to transmit and/or receive data according to a schedule based at least in part on the selected event start-time offset, wherein the schedule associates numbers of devices on the network to event start-time offsets dedicated to unicast transmissions in a substantially uniform manner;
sending a unicast message to the first device at a time indicated by the schedule;

determining that the first device has left the network; and reassigning the selected event start-time offset to a second device that is part of the network, wherein the reassigning is performed such that the distribution of numbers of devices associated with each of the plurality of event start-time offsets used by devices connected to the network has a variance that is less than a threshold value.

19. The method of claim 18, additionally comprising:

prior to reassigning the selected event start-time offset to the second device, receiving a second request to add the second device to the network, wherein the selected event start-time offset is the event start-time offset already assigned to the first device.

20. The method of claim 18, wherein the first device and the second device are battery-powered devices.

* * * * *